(12) United States Patent
Jang et al.

(10) Patent No.: US 12,477,588 B2
(45) Date of Patent: Nov. 18, 2025

(54) DEVICE AND METHOD FOR ACCESSING NETWORK IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 17/635,344

(22) PCT Filed: Aug. 14, 2020

(86) PCT No.: PCT/KR2020/010920
§ 371 (c)(1),
(2) Date: Feb. 14, 2022

(87) PCT Pub. No.: WO2021/029751
PCT Pub. Date: Feb. 18, 2021

(65) Prior Publication Data
US 2022/0279595 A1 Sep. 1, 2022

(30) Foreign Application Priority Data
Aug. 14, 2019 (KR) .................. 10-2019-0099636

(51) Int. Cl.
*H04W 72/044* (2023.01)
*H04W 72/51* (2023.01)
(Continued)

(52) U.S. Cl.
CPC ..... *H04W 74/0841* (2013.01); *H04W 72/044* (2013.01); *H04W 72/51* (2023.01);
(Continued)

(58) Field of Classification Search
CPC .......... H04W 74/0841; H04W 72/044; H04W 72/51; H04W 74/0866; H04W 48/18;
(Continued)

(56) References Cited

U.S. PATENT DOCUMENTS 10,743,299 B2   8/2020   Yi et al.
10,827,487 B2   11/2020  Huang et al.
(Continued)

FOREIGN PATENT DOCUMENTS

CN   109906570 A   6/2019
CN   109906651 A   6/2019
(Continued)

OTHER PUBLICATIONS

European Patent Office, "Supplementary European Search Report," dated Dec. 23, 2023, in connection with European Patent Application No. EP20852666.5, 19 pages.
(Continued)

*Primary Examiner* — Luat Phung

(57) ABSTRACT

The present disclosure relates to a communication technique which combines a $5^{th}$ generation (5G) communication system for supporting a higher data transmission rate beyond a 4G system with an internet of things (IoT) technique and a system thereof. The present disclosure may be applied to intelligent services (e.g., a smart home, a smart building, a smart city, a smart car or a connected car, health care, digital education, retail business, security and safety related services, etc.) based on 5G communication technology and IoT related technology. According to various embodiments of the present disclosure, in a wireless communication system, a terminal may include at least one transceiver and at least one processor coupled with the at least one transceiver, the at least one processor may be configured to receive system information from a cell of a base station, determine whether
(Continued)

the cell supports new radio (NR) lite, based on the system information, and if the cell supports the NR lite, perform a random access procedure for the cell, and for the terminal performing the NR lite, at least one of a subcarrier spacing (SCS), a transport block (TB) size, or a bandwidth part (BWP) is reduced to a designated value, compared to other terminal not performing the NR lite.

20 Claims, 13 Drawing Sheets

(51) Int. Cl.
   *H04W 74/08* (2024.01)
   *H04W 74/0833* (2024.01)
   *H04W 74/0838* (2024.01)

(52) U.S. Cl.
   CPC ... *H04W 74/0833* (2013.01); *H04W 74/0866* (2013.01); *H04W 74/0838* (2024.01)

(58) Field of Classification Search
   CPC .......... H04W 48/16; H04W 48/20; H04W 74/0833; H04W 48/08; H04W 74/002; H04W 74/004; H04W 74/006; H04W 88/02
   See application file for complete search history.

(56) References Cited

U.S. PATENT DOCUMENTS

| | | | |
|---|---|---|---|
| 10,972,887 B2 | 4/2021 | Park et al. | |
| 2016/0353371 A1* | 12/2016 | Zhang | H04W 48/10 |
| 2017/0245210 A1* | 8/2017 | Jang | H04W 4/70 |
| 2018/0077719 A1 | 3/2018 | Nory et al. | |
| 2019/0059049 A1 | 2/2019 | Jang et al. | |
| 2019/0069297 A1 | 2/2019 | Lee et al. | |
| 2019/0104554 A1 | 4/2019 | Amuru et al. | |
| 2019/0123881 A1 | 4/2019 | Lee et al. | |
| 2019/0149308 A1 | 5/2019 | Son | |
| 2019/0149421 A1 | 5/2019 | Jin et al. | |
| 2020/0221308 A1* | 7/2020 | Liao | H04W 72/0453 |
| 2020/0280894 A1* | 9/2020 | Koskinen | H04W 24/08 |
| 2020/0382264 A1* | 12/2020 | Aiba | H04L 5/0094 |
| 2020/0404600 A1* | 12/2020 | Ly | H04L 5/0051 |
| 2021/0076384 A1* | 3/2021 | MolavianJazi | H04W 72/53 |
| 2021/0168862 A1* | 6/2021 | Murray | H04W 74/002 |
| 2021/0345293 A1* | 11/2021 | Park | H04L 5/001 |

FOREIGN PATENT DOCUMENTS

| | | |
|---|---|---|
| CN | 110121211 A | 8/2019 |
| EP | 328141 A1 | 8/1989 |
| EP | 4068860 A1 | 10/2022 |
| EP | 4093128 A1 | 11/2022 |
| KR | 10-2015-0109119 A | 10/2015 |
| WO | 2016162333 A1 | 10/2016 |
| WO | 2019/032798 A1 | 2/2019 |
| WO | 2019097104 A1 | 5/2019 |

OTHER PUBLICATIONS

Samsung, "Overall view on NR evolution in Rel-17", 3GPP TSG RAN Meeting #84, Jun. 10-14, 2019, RP-191500, 20 pages.
Ericsson, "NR-Lite for Industrial Sensors and Wearables", 3GPP TSG-RAN Meeting #84, Jun. 3-6, 2019, RP-191047, 11 pages.
International Search Report dated Nov. 27, 2020 in connection with International Patent Application No. PCT/KR2020/010920, 2 pages.
Written Opinion of the International Searching Authority dated Nov. 27, 2020 in connection with International Patent Application No. PCT/KR2020/010920, 4 pages.
Office Action issued Feb. 27, 2024, in connection with Chinese Patent Application No. CN202080071831.1, 13 pages.
InterDigital Inc., "SIB and MIB provisioning in UEs active BWP,"3GPP TSG-RAN WG2 NR #101-Bis, R2-1804812, Sanya, China April 16-Apr. 20, 2018, 4 pages.
Samsung, "Overall view on NR evolution in Rel-17," 3GPP TSG RAN Meeting #84, RP-191450, Newport Beach, USA, Jun. 10-14, 2019, 20 pages.
Notice of Preliminary Rejection issued Aug. 29, 2024, in connection with Korean Patent Application No. 10-2019-0099636, 8 pages.
Notification of the Decision To Grant issued Sep. 3, 2024, in connection with Chinese Patent Application No. 202080071831.1, 7 pages.
Communication pursuant to Article 94(3) EPC dated Jan. 3, 2025, in connection with European Patent Application No. 20852666.5, 12 pages.
Notice of Patent Grant dated Apr. 30, 2025 in connection with Korean Application No. 10-2019-0099636, 4 pages.

* cited by examiner

DEVICE AND METHOD FOR ACCESSING NETWORK IN WIRELESS COMMUNICATION SYSTEM

CROSS-REFERENCE TO RELATED APPLICATIONS

This application is a 371 of International Application No. PCT/KR2020/010920 filed on Aug. 14, 2020, which claims priority to Korean Patent Application No. 10-2019-0099636 filed on Aug. 14, 2019, the disclosures of which are herein incorporated by reference in their entirety.

BACKGROUND

1. Field

The present disclosure generally relates to a wireless communication system, and more particularly, to an apparatus and a method for accessing a network in the wireless communication system.

2. Description of Related Art

To satisfy a wireless data traffic demand which is growing after a $4^{th}$ generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system. To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beamforming, and large scale antenna techniques. Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation. Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Meanwhile, Internet is evolving from a human-centered connection network over which human generates and consumes information, to an Internet of things (IoT) network over which information is exchanged and processed between distributed elements such as things. An Internet of Everything (IoE) technology in which a big data processing technology through a connection with a cloud server is combined with the IoT technology is emerging. To implement the IoT, technical elements such as sensing technology, wired/wireless communication and network infrastructure, service interface technology, and security technology are required, and technologies such as a sensor network, machine to machine (M2M), and machine type communication (MTC) for connections between things are recently researched. The IoT environment may provide an intelligent Internet technology (IT) service which creates a new value for human life by collecting and analyzing data generated from the connected things. The IoT may be applied to fields such as a smart home, a smart building, a smart city, a smart car or a connected car, a smart grid, health care, smart home appliances, and advanced medical services through convergence and composition between the existing IT and various industries.

Hence, various attempts for applying the 5G communication system to the IoT network are being made. For example, the 5G communication technologies such as sensor network, M2M, and MTC are implemented by schemes such as beamforming, MIMO, and array antenna. Applying the cloud radio access network (cloud RAN) as the big data processing technology as aforementioned may be an example of the 5G technology and IoT technology convergence.

For a terminal implemented at low cost, a solution for reducing complexity in channel access and communication is under discussion, in the NR communication system.

SUMMARY

Based on the discussions described above, the present disclosure provides an apparatus and a method for supporting an existing new radio (NR) terminal to operate in a wide bandwidth and concurrently supporting an NR-lite terminal in a narrow band within a single base station, in a wireless communication system.

According to various embodiments of the present disclosure, an operating method of a terminal in a wireless communication system may include receiving system information from a cell of a base station, determining whether the cell supports NR lite, based on the system information, and if the cell supports the NR lite, performing a random access procedure for the cell, and for the terminal performing the NR lite, at least one of a subcarrier spacing (SCS), a transport block (TB) size, or a bandwidth part (BWP) is reduced to a designated value, compared to other terminal not performing the NR lite.

According to various embodiments of the present disclosure, a terminal in a wireless communication system may include at least one transceiver and at least one processor coupled with the at least one transceiver, the at least one processor may be configured to receive system information from a cell of a base station, determine whether the cell supports NR lite, based on the system information, and if the cell supports the NR lite, perform a random access procedure for the cell, and for the terminal performing the NR lite, at least one of a subcarrier spacing (SCS), a transport block (TB) size, or a bandwidth part (BWP) is reduced to a designated value, compared to other terminal not performing the NR lite.

An apparatus and a method according to various embodiments of the present disclosure, may allow a communication operator to increase communication efficiency, by supporting an existing new radio (NR) terminal which supports broadband and an NR-lite terminal which supports only narrowband in a base station.

Effects obtainable from the present disclosure are not limited to the above-mentioned effects, and other effects which are not mentioned may be clearly understood by those skilled in the art of the present disclosure through the following descriptions.

DETAILED DESCRIPTION

Figure 1A:
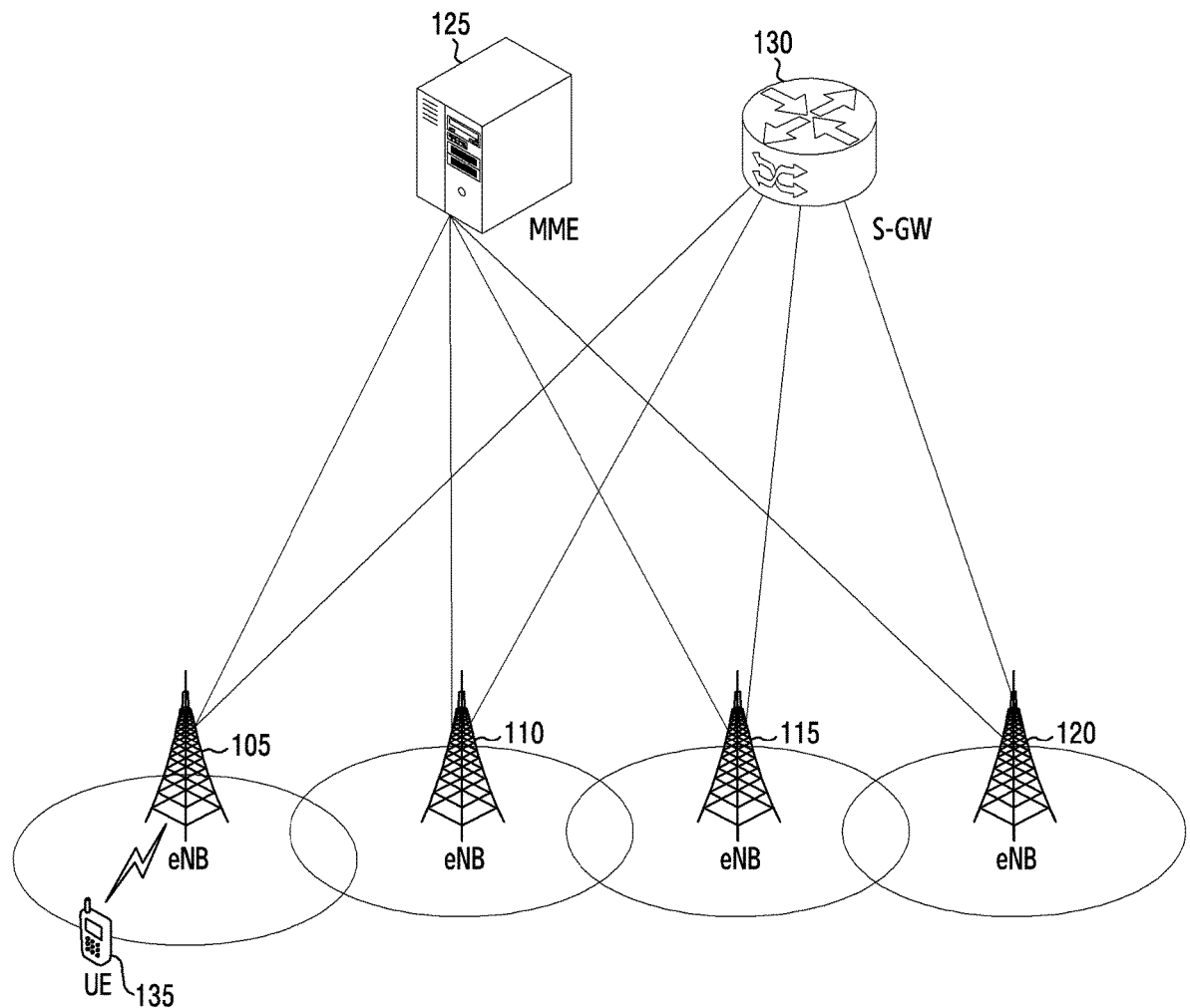
FIG. 1A illustrates an example of a wireless communication system according to various embodiments of the present disclosure.

Hereafter, the operating principle of the present invention will be described in detail with reference to the accompanying drawings. If it is determined that a detailed description of a related known function or configuration may unnecessarily obscure the subject matter of the present invention in describing the present invention, its detailed description will be omitted. Terms to be described are terms defined by considering functions of the present disclosure, which may vary according to a user's or operator's intent or practice. Hence, their definition should be made based on contents throughout this specification.

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various embodiments of the present disclosure to be described hereinafter. However, various embodiments of the present disclosure include technology which uses both hardware and software, and thus do not exclude a software-based approach.

Terms for identifying access nodes, terms indicating network entities, terms indicating messages, terms indicating interfaces between network entities, and terms indicating various identification information used in the following explanation are illustrated only for convenience of description. Accordingly, the present invention is not limited to the terms to be described, and other terms indicating targets having the same technical meaning may be used.

Hereafter, for convenience of description, the present invention uses terms and names defined in long term evolution (LTE) and new radio (NR) standards which are the latest standards defined by the 3rd generation partnership project (3GPP) organization among currently existing communication standards. However, the present invention is not limited by the terms and names, and may be applied equally to systems conforming to other standards. In particular, the present invention may be applied to 3GPP NR (5th generation mobile communication standard).

Also, in the present disclosure, to determine whether a specific condition is satisfied or fulfilled, expressions such as greater than or less than are used but is merely an expression by way of example and does not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

Hereafter, the present disclosure relates to an apparatus and a method for accessing a network in a wireless communication system. Specifically, the present disclosure relates to a method for accessing a network at a terminal simplified with minimum performance according to specific requirements from requirements of existing NR terminals such as a smart watch, and more specifically, an 'NR-light/NR-lite' terminal with reduced price and complexity, in 3GPP 5G NR.

FIG. 1A illustrates an example of a wireless communication system according to various embodiments of the present disclosure.

Referring to FIG. 1A, the wireless communication system includes several evolved universal mobile telecommunications system (UMTS) terrestrial radio access network (E-UTRAN) NodeB (eNBs) 105, 110, 115, and 120, a mobility management entity (MME) 120, and a serving-gateway (S-GW) 130. User equipment (hereafter, referred to as a UE or a terminal) 135 accesses an external network through the eNB 105, 110, 115, and 120 and the S-GW 130.

The eNBs 105, 110, 115, and 120 are access nodes of a cellular network and provide radio access to UEs accessing the network. That is, the eNBs 105, 110, 115, and 120 collect and schedule status information such as buffer status, available transmission power status, and channel status of the UEs to service users' traffic and thus support connections between the UEs and a core network (CN). The MME 125 is a device for various control functions as well as a mobility management function for the UE, and is connected to a plurality of eNBs, and the S-GW 130 is a device which provides a data bearer. In addition, the MME 125 and the S-GW 130 may further perform authentication and bearer management for the UE accessing the network, and process a packet received from the eNB 105, 110, 115, and 120 or a packet to be delivered to the gNB 105, 110, 115, and 120.

Figure 1B:
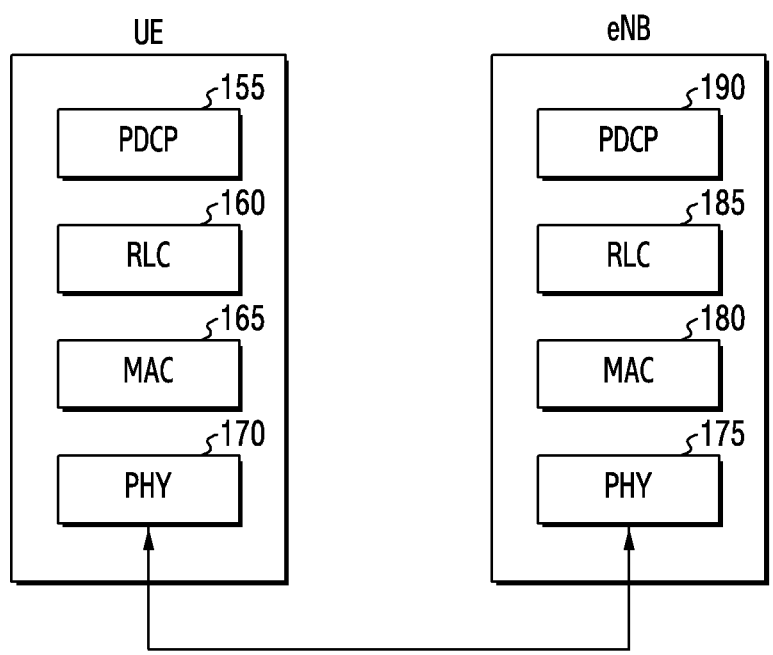
FIG. 1B illustrates an example of a radio protocol structure in a wireless communication system according to various embodiments of the present disclosure.

FIG. 1B illustrates an example of a radio protocol structure in the wireless communication system according to various embodiments of the present disclosure.

Referring to FIG. 1B, the radio protocol of the LTE system includes packet data convergence protocols (PDCPs) 155 and 190, radio link controls (RLCs) 160 and 185, and media access controls (MACs) 155 and 190 at the UE and the eNB respectively. The PDCP 155 and 190 manages operations such as internet protocol (IP) header compression/restoration, and the RLC 160 and 195 reconstructs a PDCP packet data unit (PDU) to an appropriate size. The MAC 165 and 190 is connected to several RLC layer devices configured in one UE, and multiplexes RLC PDUs to a MAC PDU and demultiplexes RLC PDUs from a MAC PDU. Physical layers 170 and 185 channel encode and modulate upper layer data, generate them into OFDM symbols and transmit them over a radio channel, or demodulate OFDM symbols received over the radio channel and forward them to the upper layer. In addition, the physical layer also uses hybrid automatic repeat request (HARQ) for additional error correction, and the receiving stage transmits whether the packet transmitted by the transmitting stage is received or not with 1 bit. This is referred to as HARQ acknowledge (ACK)/negative ACK (HACK) information. Downlink HARQ ACK/NACK information for uplink data transmission is transmitted over a physical hybrid-ARQ indicator channel (PHICH) physical channel in the LTE, although not depicted in this drawing, a radio resource control (RRC) layer exists above each PDCP layer of the UE and the eNB, and the RRC layer may exchange access and measurement related configuration control messages for radio resource control.

Meanwhile, the PHY layer may include one or a plurality of frequencies/carriers, and a technique for simultaneously setting and using a plurality of frequencies is referred to as carrier aggregation technique (hereafter, referred to as CA). The CA technique may dramatically increase the transmission amount by the number of secondary carriers by additionally using a primary carrier and one or more secondary carriers, rather than using only one carrier for communication between the UE and the eNB. Meanwhile, a cell in the eNB using the primary carrier is referred to as a primary cell or a PCell, and a cell in the eNB using the subcarrier is referred to as a secondary cell or a SCell in the LTE.

Figure 2A:
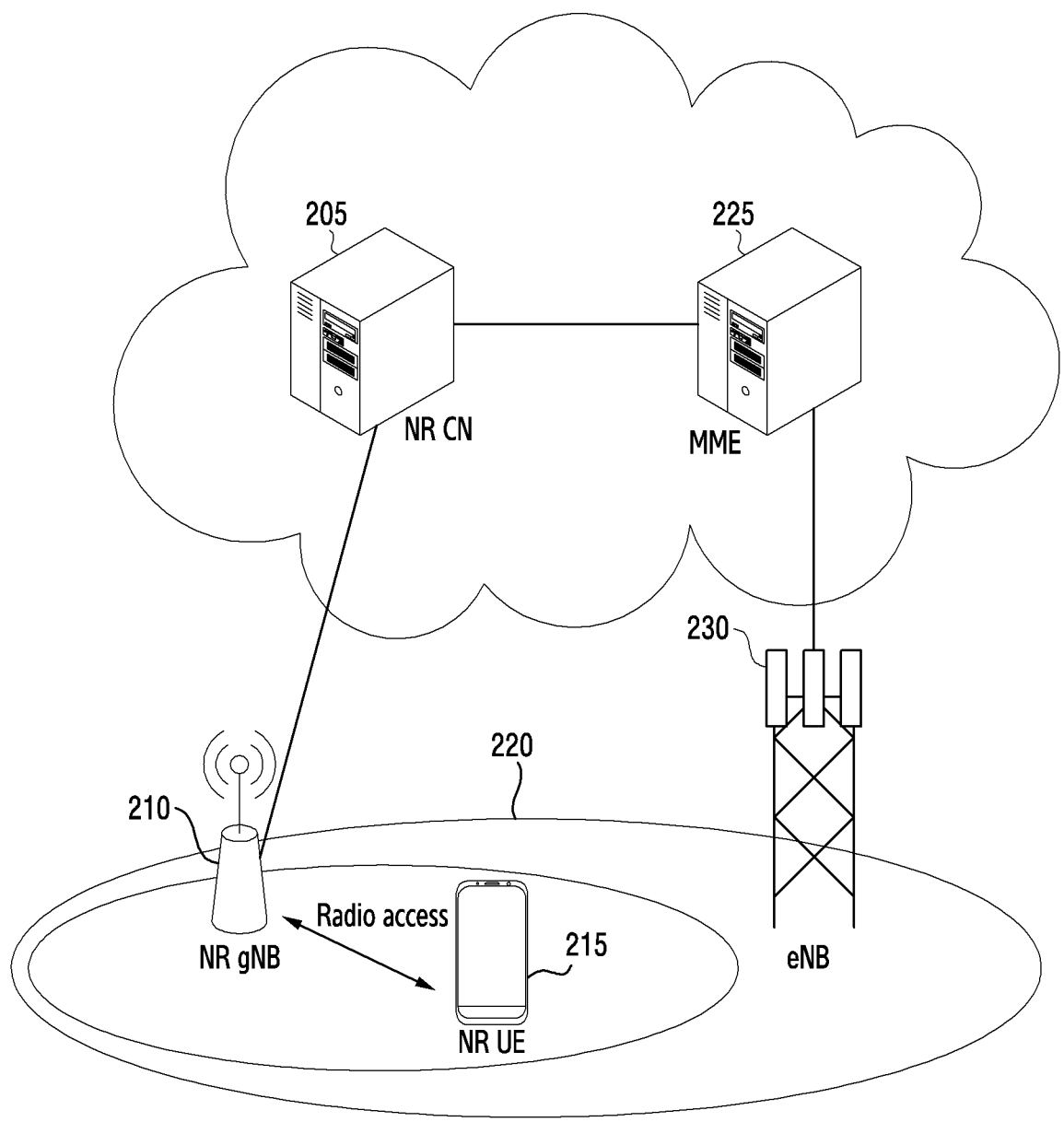
FIG. 2A illustrates another example of a wireless communication system according to various embodiments of the present disclosure.

FIG. 2A illustrates another example of a wireless communication system according to various embodiments of the present disclosure. The structure of the wireless communication system shown in FIG. 2A may include a system adopting the NR. According to an embodiment, the NR may refer to a communication system for achieving high data rate, high reliability and/or low latency data communication compared to the LTE. Hereafter, in the present disclosure, the system to which the NR is applied may be simply referred to as an 'NR system', a '5G communication system', or a 'next-generation mobile communication system'. A cell of the NR system may be referred to as an 'NR cell'.

Figure 2B:
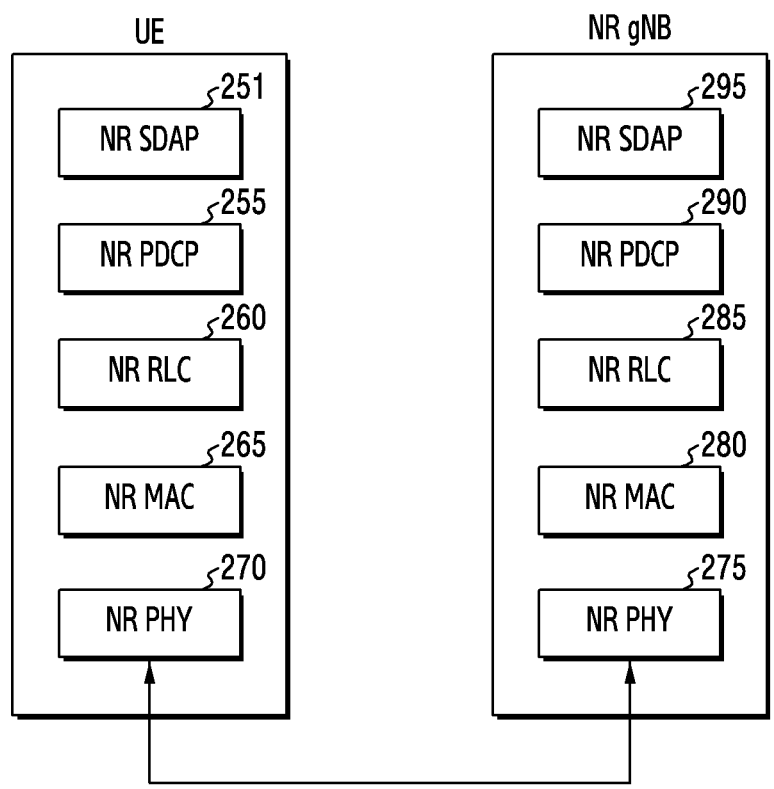
FIG. 2B illustrates another example of a radio protocol structure of a wireless communication system according to various embodiments of the present disclosure.

Referring to FIG. 2B, a radio access network of the next-generation mobile communication system (hereafter, referred to as NR or 5 g) may include a new radio node B (hereafter, referred to as an NR gNB or an NR base station) 210 and a new radio core network (NR CN) 205. The new radio user equipment (NR UE or UE) 215 may access an external network via the NR gNB 210 and the NR CN 205.

In FIG. 2A, the NR gNB 210 may correspond to an eNB of the existing LTE system. The NR gNB is connected with the NR UE 215 over a radio channel, and may provide a far better service than the existing Node B. In the NR, every user traffic may be serviced over the shared channel. Hence, a device for collecting and scheduling status information such as buffer status, available transmission power status, and channel status of UEs is necessary, and which may be served by the NR NB 210. One NR gNB may control a plurality of cells. The NR may adopt a bandwidth greater than the current maximum bandwidth, to implement ultra-high speed data transmission compared to the current LTE. In addition, a beamforming technique may be additionally combined with an orthogonal frequency division multiplexing (OFDM) technique as the radio access technique. In addition, an adaptive modulation & coding (hereafter referred to as AMC) scheme for determining a modulation scheme and a channel coding rate according to the channel status of the UE may be applied.

The NR CN 205 may perform functions such as mobility support, bearer configuration, and quality of service (QoS) configuration. The NR CN is a device for managing various control functions as well as a mobility management function for the UE, and may be connected to a plurality of gNBs. In addition, the NR may interwork with the existing LTE system, according to an embodiment, and the NR CN may be connected to an MME 225 through a network interface. The MME may be connected to the eNB 230 which is the existing gNB.

FIG. 2B illustrates another example of the radio protocol structure of the wireless communication system according to various embodiments of the present disclosure. The radio protocol structure shown in FIG. 2B may be the radio protocol structure of the NR system.

Referring to FIG. 2B, the radio protocol of the NR system includes NR service data adaptation protocols (SDAPs) 251 and 295, NR PDCPs 255 and 290, NR RLCs 260 and 285, NR MACs 265 and 280, and NR PHYs 270 and 285 in the UE and the NR gNB respectively.

Main functions of the NR SDAP 251 and 295 may include some of the following functions.
 transfer of user plane data
 mapping between a QoS flow and a DRB for both DL and UL
 marking QoS flow ID in both DL and UL packets
 reflective QoS flow to DRB mapping for the UL SDAP PDUs.

For an SDAP layer device, the UE may be configured with whether to use a header of the SDAP layer device or to use a function of the SDAP layer device function for each PDCP layer device, bearer or logical channel with an RRC message. If the SDAP header is configured, the UE may instruct the UE to update or reconfigure QoS flow and data bearer mapping information of uplink and downlink, with a non-access stratum (NAS) reflective QoS 1-bit indicator, and an access stratum (AS) reflective QoS 1-bit indicator of the SDAP header. The SDAP header may include QoS flow ID information indicating the QoS. The QoS information may be used as a data processing priority, scheduling information, and the like for supporting a smooth service.

Main functions of the NR PDCP 255 and 290 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

In the above description, the reordering of the NR PDCP device may indicate a function of reordering PDCP PDUs received from the lower layer in order based on a PDCP sequence number (SN). The reordering of the NR PDCP device may include a function of delivering data to the upper layer in the rearranged order, may include a function of directly delivering it without considering the order, may include a function of recording PDCP PDUs lost by rearranging the order, may include a function of reporting the status of the lost PDCP PDUs to the transmitting stage, and may include a function of requesting retransmission of the lost PDCP PDUs.

Main functions of the NR RLC 260 and 285 may include some of the following functions.

Transfer of upper layer PDUs
    In-sequence delivery of upper layer PDUs
    Out-of-sequence delivery of upper layer PDUs
    Error Correction through ARQ
    Concatenation, segmentation and reassembly of RLC SDUs
    Re-segmentation of RLC data PDUs
    Reordering of RLC data PDUs
    Duplicate detection
    Protocol error detection
    RLC SDU discard
    RLC re-establishment In the above description, the in-sequence delivery of the NR RLC device may indicate a function of sequentially delivering RLC SDUs received from the lower layer to the upper layer in order. If one original RLC SDU is segmented into several RLC SDUs and received, the in-sequence delivery of the NR RLC device may include a function of reassembling and delivering them.

The in-sequence delivery of the NR RLC device may include the function of reordering the received RLC PDUs based on an RLC SN or a PDCP SN, may include the function of recording RLC PDUs lost by rearranging the order, may include the function of reporting the status of the lost RLC PDUs to the transmitting stage, and may include the function of requesting retransmission of the lost RLC PDUs.

The in-sequence delivery of the NR RLC 260 and 285 devices may include, if there is a lost RLC SDU, the function of sequentially delivering only RLC SDUs before the lost RLC SDU to the upper layer. In addition, the in-sequence delivery function of the NR RLC device may include the function of sequentially delivering all RLC SDUs received before a timer starts to the upper layer if a specific timer expires even with the lost RLC SDU. In addition, the in-sequence delivery function of the NR RLC device may include the function of sequentially delivering all RLC SDUs received so far to the upper layer if the specific timer expires even with the lost RLC SDU.

The NR RLC 260 and 285 devices may process the RLC PDUs in reception order regardless of the sequence number (out-of sequence delivery) and deliver them to the NR PDCP 405, 440 devices.

If receiving a segment, the NR RLC 260 and 285 devices may receive segments stored in a buffer or to be received, reconstruct them into one complete RLC PDU, and deliver it to the NR PDCP device.

The NR RLC layer may not include the concatenation function, and may perform the function in the NR MAC layer or may replace it with a multiplexing function of the NR MAC layer.

In the above description, the out-of-sequence delivery of the NR RLC device may indicate a function of directly delivering RLC SDUs received from the lower layer to the upper layer regardless of the order. The outs-sequence delivery of the NR RLC device may include, if one original RLC SDU is segmented into several RLC SDUs and received, the function of reassembling and delivering them. The out-of-sequence delivery of the NR RLC device may include the function of storing the RLC SN or the PDCP SN of the received RLC PDUs, arranging their order, and recording the lost RLC PDUs.

The NR MACs 265 and 280 may be connected to several NR RLC layer devices configured in one UE, and main functions of the NR MAC may include some of the following functions.

Mapping between logical channels and transport channels
    Multiplexing/demultiplexing of MAC SDUs
    Scheduling information reporting function
    Error correction through HARQ
    Priority handling between logical channels of one UE
    Priority handling between UEs by means of dynamic scheduling
    MBMS service identification
    Transport format selection
    Padding function The NR PHY layer 260 and 275 may perform an operation of channel coding and modulating upper layer data, and generating and transmitting an OFDM symbol over the radio channel, or demodulating and channel decoding an OFDM symbol received over the radio channel and delivering it to the upper layer. The NR may determine whether retransmission is necessary, or whether new transmission is performed through the scheduling information of the corresponding UE in a physical dedicated control channel (PDCCH) which is a channel through which downlink/uplink resource allocation is transmitted. This is because asynchronous HARQ is applied in the NR. Uplink HARQ ACK/NACK information for downlink data transmission may be transmitted over a physical uplink control channel (PUCCH) or physical uplink shared channel (PUSCH) physical channel. The PUCCH is generally transmitted in the uplink of the PCell to be described, but if the UE supports it, the gNB may additionally transmit to the corresponding UE in the SCell to be described, which is referred to as a PUCCH SCell.

Hereafter, the present disclosure describes operations of a base station or a terminal in a wireless communication system. The base station may be referred to as, besides the base station, an 'access point (AP)', an eNodeB (eNB)', a '5G node', a 'next generation (G) node B (gNB)', a 'wireless point', or other term having the technically identical meaning. According to various embodiments, the base station may be connected with one or more 'transmission/reception points (TRPs)'. The base station may transmit a downlink signal or receive an uplink signal to or from the terminal, via one or more TRPs. Hereafter, the present disclosure describes the base station as a network node for transmitting a radio signal to the terminal by way of example. However, the present disclosure is not limited to these terms. The radio signal transmission may include a configuration in which the base station is connected to the TRP and the TRP transmits the radio signal.

The terminal may be referred to as, besides the terminal, a 'UE', a 'mobile station', a 'subscriber station', a 'customer premises equipment (CPE)', a 'remote terminal', a 'wireless terminal', an 'electronic device', a 'user device' or other term having technically equivalent meaning.

The communication node (e.g., a terminal, a base station, and a core network entity) according to various embodiments of the present disclosure may operate in the LTE system. In addition, the communication node (e.g., a terminal, a base station, and a core network entity) according to various embodiments of the present disclosure may operate in the NR system. Further, the communication node (e.g., a terminal, a base station, and a core network entity) according to various embodiments of the present disclosure may operate in both the LTE system and the NR system. That is, the structure and layer explanations shown in FIG. 1A through FIG. 2B are exemplary, and any one communication system may not exclude other communication system.

Figure 3:
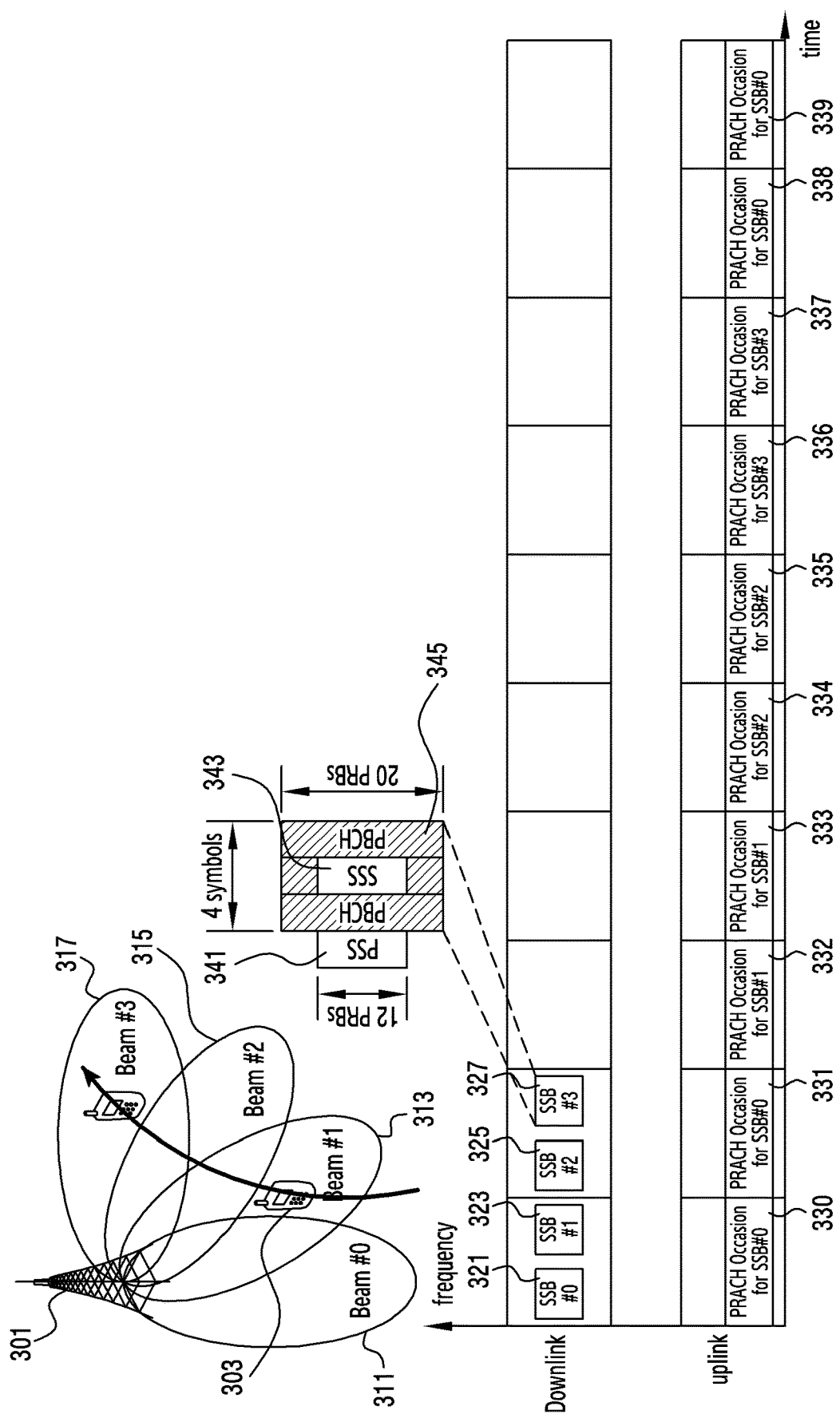
FIG. 3 illustrates an example of a downlink and uplink channel frame structure in beam-based communications in a wireless communication system according to various embodiments of the present disclosure.

FIG. 3 illustrates an example of a downlink and uplink channel frame structure in beam-based communication in a wireless communication system according to various embodiments of the present disclosure.

Referring to FIG. 3, an eNB 301 transmits signals in the form of the beam for wider coverage or to transmit stronger signals 311, 313, 315, and 317. Hence, a UE 303 in the cell needs to transmit and receive data using a specific beam transmitted by the eNB (a beam #1 313 in this exemplary drawing).

Meanwhile, depending on whether the UE is connected to the eNB, the state of the UE is divided into an idle mode RRC_IDLE or a connected mode RRC_CONNECTED state. Hence, the eNB does not know the location of the UE in the idle mode state.

If the UE in the idle mode state is to switch to the connected mode state, the UE receives synchronization signal/physical broadcast channel (SS/PBCH) blocks 321, 323, 325, and 327 transmitted by the eNB. The SS/PBCH block may be referred to as an SSB. The SSB may be repeatedly transmitted according to a period which is set by the eNB. Each SSB may include a primary synchronization signal (PSS) 341, a secondary synchronization signal (SSS) 343, and a physical broadcast channel (PBCH).

A scenario in which the SSB is transmitted for each beam is assumed in this exemplary drawing. For example, it has been assumed that an SSB #0 321 is transmitted using a beam #0 311, an SSB #1 323 is transmitted using a beam #1 313, an SSB #2 325 is transmitted using a beam #2 315, and an SSB #3 327 is transmitted using a beam #3 317. It is assumed that the UE of the idle mode is located in the beam #1 313 in this exemplary drawing, but the UE selects the SSB received at random access even if the UE of the connected mode performs the random access.

Thus, the UE 303 receives the SSB #1 323 transmitted in the beam #1 313. Upon receiving the SSB #1 323, the UE 303 may acquire a physical cell identifier (PCI) of the eNB 301 through the PSS and the SSS, and obtain an identifier (that is, #1) of a currently received SSB, the location at which the current SSB is received within a 10 ms frame, and a system frame number (SFN) within an SFN having a period of 10.24 seconds by receiving the PBCH. In addition, the PBCH includes a master information block (MIB), which notifies a location for receiving a system information block type 1 (SIB 1) for broadcasting more detailed cell configuration information in the MIB. Upon receiving SIB1, the UE 303 may know the total number of SSBs transmitted by the eNB 301, and obtain the location (this exemplary drawing assumes a scenario of allocation every 1 ms: from 330 to 339) of a physical random access channel (PRACH) occasion for performing the random access (more specifically, transmitting a preamble which is a physical signal specially designed to achieve uplink synchronization) to transit to the connected mode state. Further, based on the information, the UE 303 may obtain the mapped PRACH occasion among the PRACH occasions and the SSB index. For example, this exemplary drawing assumes a scenario of the allocation every 1 ms, and a scenario of allocating ½ SSB per PRACH occasion (i.e., 2 PRACH occasions per SSB). Hence, the scenario in which two RPACH occasions are allocated per SSB from the start of the PRACH occasion starting according to the SFN is illustrated. For example, the PRACH occasions 330 and 331 may be allocated for SSB #0 and the PRACH occasions 332 and 333 may be allocated for SSB #1. The PRACH occasions may be configured for all the SSBs and then, the PRACH occasion may be allocated back for the first SSB.

Hence, the UE 303 recognizes the positions of the PRACH occasions 332 and 333 for SSB #1 323 and thus transmits a random access preamble in the earliest PRACH occasion at the current point among the PRACH occasions 332 and 333 corresponding to SSB #1 (e.g., the PRACH occasion 332). Since the eNB 301 receives the preamble of the UE 303 in the PRACH occasion 332, it may obtain that the corresponding UE 303 selects SSB #1 and transmits the preamble. In addition, the eNB 301 transmits and receives data through the corresponding beam (e.g., the beam #1 313) in a subsequent random access procedure.

Meanwhile, even if the UE of the connected state moves from a current (source) eNB to a destination (target) eNB on account of handover, the UE may perform the random access at the target eNB and the UE may perform an operation of selecting the SSB and transmitting the random access. Besides, in the handover, a handover command may be transmitted to the UE to move from the source eNB to the target eNB, wherein the message may be allocated with a corresponding UE dedicated random access preamble identifier for each SSB of the target eNB to be used in the random access of the target eNB. At this time, the eNB may not allocate the dedicated random access preamble identifiers to all beams (depending on the current location of the UE), and accordingly the dedicated random access preambles may not be allocated to some SSBs (e.g., the dedicated random access preambles are allocated only to the beam #2 315 and the beam #3 317). If the dedicated random access preamble is not allocated to the SSB selected by the UE for the preamble transmission, the UE performs the random access by randomly selecting a contention based random access preamble. For example, it is assumed in the drawing that the UE 303 is initially located in coverage of the beam #1 and performs the random access but fails in the random access. The UE 303 may be located in coverage of the beam #3 317, through movement. The UE 303 may transmit the dedicated random access preamble based on the SSB #3 327 transmitted through the beam #3 317. That is, if preamble retransmission occurs, the contention based random access procedure and a non-contention based or content free based random access procedure may coexist, within one random access procedure eve in one random access procedure, depending on whether the dedicated random access preamble is allocated to the selected SSB in every preamble transmission.

Figure 4:
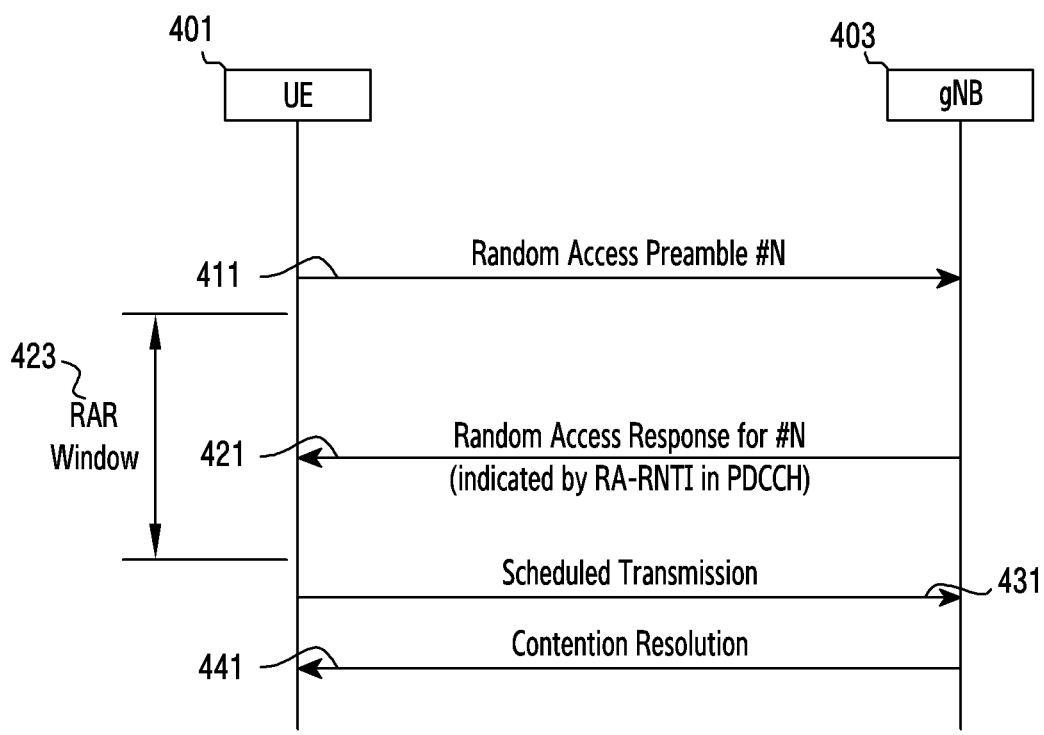
FIG. 4 illustrates an example of a random access procedure in a wireless communication system according to various embodiments of the present disclosure.

FIG. 4 illustrates an example of a random access procedure in a wireless communication system according to various embodiments of the present disclosure. It is a diagram showing a contention based 4-step random access procedure performed by the UE in case of an initial access, re-access, handover, or other random access to the gNB.

Referring to FIG. 4, in step 411, a UE 401 may transmit a random access preamble to a gNB 403. The random access preamble may be referred to as a message (MSG) 1. For access to the gNB 403, the UE 401 selects a PRACH Occasion according to FIG. 3 described above, and transmits the random access preamble to the corresponding PRACH based on the selected PRACH Occasion 411. One or more UEs may simultaneously transmit the random access preamble through PRACH resources. The PRACH resources may cover one subframe, or may use only some symbols within one subframe. PRACH resource information is included in system information broadcast by the gNB 403, and accordingly the UE 401 may obtain a time frequency resource for transmitting the preamble. In addition, the random access preamble is a specific sequence specially designed to enable reception even if it is transmitted before being completely synchronized with the gNB 403, there may be a plurality of preamble identifiers (index) as defined in the standard, and if there are a plurality of preamble identifiers, the random access preamble transmitted by the UE 401 may be randomly selected by the UE or a specific preamble designated by the gNB 403.

In step 421, the gNB 403 may transmit a random access response (RAR) to the UE 401. The RAR may be referred to as an MSG 2. If the gNB 403 receives the random access preamble of step 411, the gNB 403 may transmit the RAR message for it to the UE 401. The RAR message may include identifier information of the preamble used in step 411. For example, if a plurality of UEs attempts the random access by transmitting different preambles in step 411, the RAR message many include responses to the preambles respectively. The preamble identifier information included in the RAR message is transmitted to notify which preamble the corresponding response is a response message for.

In addition, the RAR message may include uplink transmission timing correction information, uplink resource allocation information to be used in step 431 and temporary UE identifier information (e.g., a temporary cell-radio network temporary identifier (TC-RNTI)). The uplink resource allocation information, included in each response of each preamble, is detailed information of the resources to be used by the UE in step 431, and includes physical location and size of the resource, and modulation and coding scheme (MCS) used in transmission, transmission power adjustment information, and so on. If the UE transmitting the preamble performs the initial access, the UE does not have the identifier assigned by the gNB for the communication with the gNB, and accordingly the temporary UE identifier information is a value transmitted to be used for it.

Meanwhile, the RAR message may include not only the response(s) for each preamble but also, optionally, a backoff indicator (BI). The backoff indicator is a value transmitted, if the random access is not successfully performed and the random access preamble needs to be retransmitted, to randomly delay the transmission according to a value of the backoff indicator, without immediately retransmitting the preamble. In more detail, if the UE does not correctly receive the RAR, or if contention resolution to be described is not successfully performed, the UE needs to retransmit the random access preamble. At this time, the value indicated by the backoff indicator may indicate an index value of the following Table 1, and the UE may select a random value from 0 to the value indicated by the index value. The UE retransmits the random access preamble after a time corresponding to the selected value. For example, if the gNB indicates 5 (i.e., 60 ms) as the BI value and the UE randomly selects a value 23 ms between 0 and 60 ms, the UE stores the selected value in a variable PREAMBLE BACKOFF and the UE performs a procedure of retransmitting the preamble after the time 23 ms. If the backoff indicator is not transmitted, if the random access is not successfully performed and the random access preamble needs to be retransmitted, the UE immediately transmits the random access preamble.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

The RAR message should be transmitted within a designated duration starting after a designated time after transmitting the preamble, and the duration may be referred to as an 'RAR window 423'. The RAR window starts at a timing after a designated time from a first preamble transmission. The designated time may have a subframes unit (1 ms) or a smaller value. Also, the length of the RAR window may be a designated value configured per PRACH resource or per one or more PRAHC resource set within the system information message broadcasted by the gNB.

Meanwhile, if the RAR message is transmitted, the gNB schedules the corresponding RAR message over the PDCCH, and the corresponding scheduling information is scrambled using a random access-radio network temporary identifier (RA-RNTI). The RA-RNTI may be determined based on the PRACH resources used to transmit the random access preamble. The UE transmitting the random access preamble in specific PRACH resources attempts PDCCH reception based on the corresponding RA-RNTI and determines whether there is a corresponding RAR message. That is, if the RAR message is a response to the random access preamble transmitted by the UE in step 411 as shown in the drawing, the RA-RANTI used for the RAR message scheduling information includes information of the random access preamble transmission of step 411. For doing so, the RA-RNTI may be calculated by the following equation.

$$\text{RA-RNTI} = 1 + s\_id + 14 \times t\_id + 14 \times 80 \times f\_id + 14 \times 80 \times 8 \times ul\_carrier\_id$$

In this case, the s_id is an index corresponding to the first OFDM symbol in which the random access preamble transmission of step 411 starts, and has a value $0 \leq s\_id < 14$ (i.e., the maximum number of OFDMs in one slot). In addition, t_id is an index corresponding to the first slot in which the random access preamble transmission of step 411 starts, and has a value 0≤t_id<80 (i.e., the maximum number of slots in one system frame 10 ms in consideration of PRACH subcarrier spacing (SCS)). In addition, the f_id indicates which PRACH resource (i.e., PRACH occasion) transmits the random access preamble of the step 411 on the frequency, and has a value 0≤f_id<8 (i.e., the maximum number of PRACHs on the frequency within the same time). If two carriers are used as the uplink for one cell, the ul_carrier_id is an indicator for distinguishing them. The two carriers include a normal uplink (NUL) and a supplementary uplink (SUL). In the NUL, ul_carrier_id may have the value of 0, and in the SUL, ul_carrier_id may have the value of 1.

In step 431, the UE 401 may perform a scheduled transmission to the gNB 403. Herein, the scheduled transmission may include the identity of the UE 401 (i.e., UE identity), and the transmitted message may be referred to as an MSG 3. The message may be transmitted through the PUSCH. The UE receiving the RAR message may transmit a different message according to the various purposes mentioned earlier, in the resources allocated to the RAR message. For example, the Msg3 transmitted by the UE may be a RRCSetupRequest message which is an RRC layer message in the initial access, a RRCReestablishmentRequest message in the re-access, and a RRCReconfigurationComplete message in the handover. Alternatively, a buffer status report (BSR) message for resource request may be transmitted.

In step 441, the gNB 403 may transmit a contention resolution message to the UE 401. In the initial access (i.e., if the Msg3 does not include gNB identifier information previously allocated to the UE 401, etc.), the UE 401 may receive the contention resolution message from the gNB 403. The contention resolution message includes the content transmitted by the UE in the Msg3 as it is, and even if a plurality of UEs selects the same preamble in step 411, the gNB 403 may notify which UE the response is for.

Figure 5:
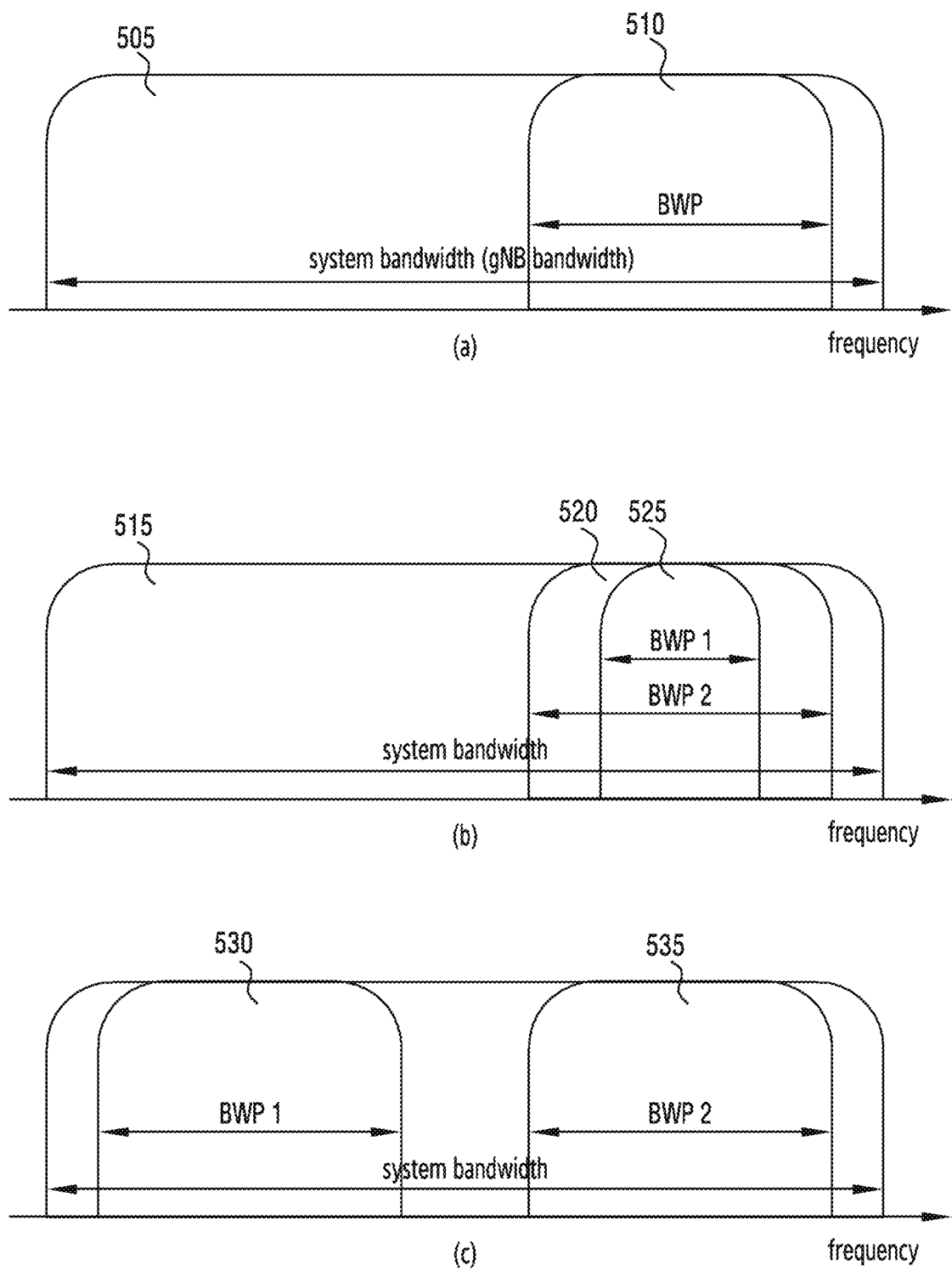
FIG. 5 illustrates examples of bandwidth part (BWP) operation in a wireless communication system according to various embodiments of the present disclosure.

FIG. 5 illustrates examples of bandwidth part (BWP) operation in a wireless communication system according to various embodiments of the present disclosure. A BWP may be used in the NR communication system, for one UE to perform communication using only some frequency bandwidth, in the system bandwidth used by one cell. The BWP is used for terminal manufacturing cost reduction or terminal power saving. The BWP may be set by the gNB only for a UE supporting it.

Referring to FIG. 5, there are largely three BWP operation scenarios.

The first scenario applies the BWP, for the UE which supports only a bandwidth 510 narrower than a system bandwidth 505 used by one cell. To reduce the manufacturing cost, a specific UE may be developed to support a limited frequency bandwidth. The UE needs to report supporting only the limited bandwidth to the base station, and accordingly the gNB configures the maximum bandwidth or less BWP supported by the UE.

The second scenario applies the BWP for the terminal power saving. For example, one UE performs the communication, using the whole system bandwidth 515 used by one cell or a partial bandwidth (e.g., a second BWP 520), but the communication base station may set a narrower bandwidth (e.g., a first BWP 525) for the sake of the power saving.

The third scenario applies individual BWPs corresponding to different numerologies. The numerology means that the physical layer configuration is diversified, to implement optimal data transmission according to various service requirements. For example, an orthogonal frequency division multiple access (OFDMA) structure including a plurality of subcarriers may variably adjust the SCS according to designated requirements. One UE may communicate based on a plurality of numerologies at the same time. At this time, since the physical layer configuration corresponding to each numerology may be different, it is desirable to divide and operate each numerology into separate first BWP 530 and second BWP 535.

Meanwhile, if the UE transits from the RRC_IDLE state or the RRC_INACTIVE state to the RRC_CONNECTED state, the BWP used for the UE to attempt to access the network is referred to as an initial BWP. If the UE succeeds in accessing the gNB and enters the RRC_CONNECTED state, the UE may receive an additional BWP from the gNB. In this case, one of the BWPs additionally set by the gNB may be set as a default BWP to be described, and the initial BWP becomes the default BWP if the default BWP is not separately set.

In addition, in the above scenarios, the terminal may be configured with a plurality of BWPs, and then a specific BWP may be activated among the BWPs set by the gNB. For example, a scenario in which the UE may receive the first BWP 530 and the second BWP 535 and the gNB activates one of the two BWPs in the third scenario is possible. Hence, the UE may transmit and receive data through the active BWP for the downlink and the uplink in the above scenarios.

If the plurality of the BWPs is set, the UE may change the activated BWP, and this change is referred to as BWP switching. This may be performed by allocating resources to the BWP to be switched in the PDCCH transmitted by the gNB.

In an unlicensed band, a scenario using the same numerologies in the third scenario may be operated. For example, since devices such as wireless local area network (LAN) operate in the bandwidth of 20 MHz in the unlicensed band, the base station may configure several BWPs corresponding to 20 MHz such as the first BWP 530 and the second BWP 535 of this drawing, and move each BWP for the UE(s) according to a congestion level of the unlicensed band.

In the second scenario, for example, if communicating on a wide bandwidth (e.g., the system bandwidth 515, the first BWP 520) in the activated PCell or SCell and not scheduled for a time bwp-InactivityTimer set by the gNB in the corresponding cell, the UE may change/switch the BWP to the default BWP (e.g., the second BWP 525). Hence, the previously used BWP is deactivated, and the default BWP is activated. Alternatively, if communicating in a specific bandwidth (e.g., the second BWP 525) and indicated by the gNB to schedule to another BWP over the PDCCH, the UE moves to the indicated BWP (e.g., the first BWP 520), wherein the existing BWP is deactivated and the indicated BWP is activated. At this time, the activated (i.e., currently used) BWP may be referred to as an active BWP.

Meanwhile, the NR communication system supports the broadband (e.g., 100 MHz) frequency bandwidth, but all UEs do not need to support the broadband. For example, a wearable device such as a smart watch may require only the bandwidth enough to communicate. Thus, necessity of a UE simplified with only essential functions from the requirements of the existing NR UEs emerges, such a UE may be referred to as an 'NR-lite' UE. For example, the NR-lite UE may support a smaller bandwidth (e.g., 10 MHz or 20 MHz) than the bandwidth of the existing NR UEs, and the SCS may also support only basic values such as 15 kHz. In addition, the NR-lite UE may be limited to 20 Mbps or the like in the maximum supported data rate. Hereafter, a procedure for the NR-lite UE to access the network is described in FIG. 6 and FIG. 7. Hereafter, various embodiments of the present disclosure are described by referring to the UE having the limited performance as the NR-lite UE, but terms such as a 'light UE', a 'small UE', and a 'thin UE', a 'low cost UE', a 'low power UE', a 'limited BWP UE', a 'reduced BWP UE', an 'IoT device' may be used interchangeably, instead of the term of the NR-lite UE.

Figure 6:
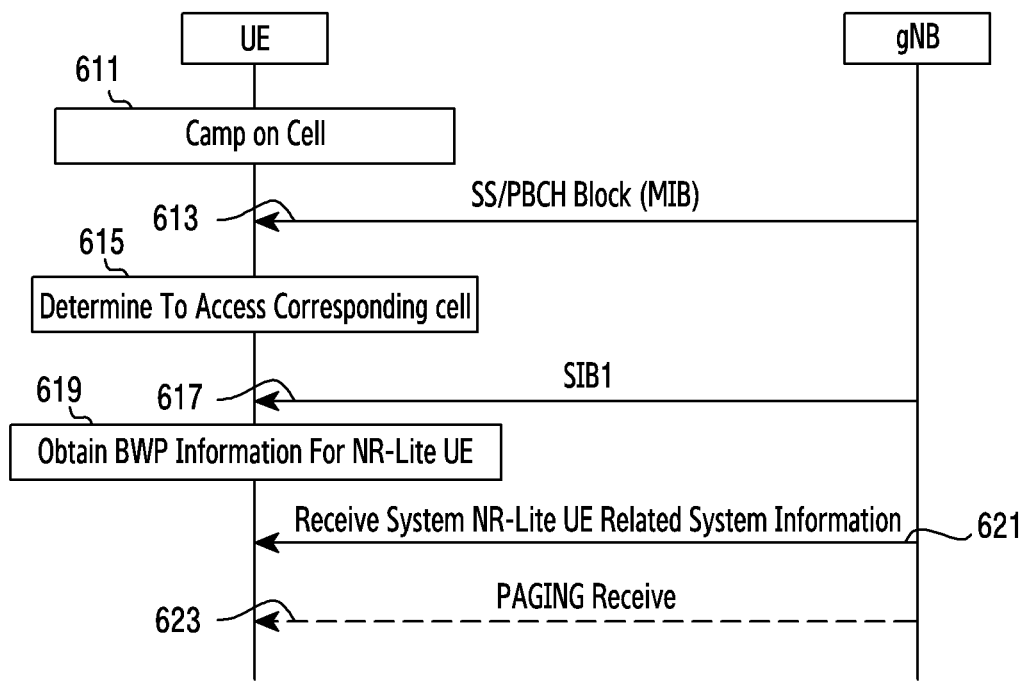
FIG. 6 illustrates an example of an initial access procedure of a new radio (NR)-lite terminal in a wireless communication system according to various embodiments of the present disclosure.

FIG. 6 illustrates an example of an initial access procedure of an NR-lite UE in a wireless communication system according to various embodiments of the present disclosure. The NR-lite UE may transmit or receive messages, to access the gNB.

Referring to FIG. 6, in step 611, the NR-lite UE may camp on the cell. The NR-lite UE may be in the idle mode RRC_IDLE state without connection to the gNB. The NR-lite UE may camp at a gNB where a signal is detected to receive data transmitted from the network.

In step 613, the NR-lite UE may receive an SS/PBCH block from the gNB. The UE may receive the SS/PBCH block transmitted from the gNB of the camped-on cell in step 611. The description of the SS/PBCH block of FIG. 3 may be applied to the description of the SS/PBCH block in the same or similar manner. The SS/PBCH block may include the MIB of the PBCH in addition to the synchronization signal of the PSS and the SSS. The NR-lite UE may obtain the MIB from the PBCH. For example, the structure of the MIB may be configured as shown in the following [Table 2].

TABLE 2

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

In step 615, the NR-lite UE may determine to access the corresponding cell. The NR-lite UE may determine whether to access the camped-on cell in step 611 based on the MIB. That is, the NR-lite UE may primarily determine whether the cell is accessible by the NR-lite UE using information included in the MIB. Hereafter, a method of the NR-lite UE to determine the accessible cell according to various embodiments of the present disclosure is described.

In some embodiments, the NR-lite UE may determine whether the corresponding cell is accessible based on subCarrierSpacingCommon in the MIB. If the NR-lite UE supports only 15 kHz for the SCS, the NR-lite UE may determine whether the subCarrierSpacingCommon value is scs15or60. If the subCarrierSpacingCommon value is scs30or120, the NR-lite UE may determine that the SCS such as SIB1 is 30 kHz (or 120 kHz), and determine that the access to the corresponding cell is barred. Next, the NR-lite UE may attempt the camping by searching for another cell within the same carrier frequency. Additionally, if determining that all cells of the corresponding carrier frequency do not support the NR-lite UE, or if assuming that all cells do not support the NR-lite UE, the NR-lite UE may stop the cell search of the corresponding carrier frequency and attempt the camping by searching for another cell of another carrier frequency.

In addition, even if the SCS value supports 15 kHz, the NR-lite UE may identify pdcch-ConfigSIB1 and determine whether additional access is possible. The pdcch-ConfigSIB1 indicates a set of resources for monitoring the PDCCH of the scheduled SIB1 (this resource set may be referred to as a control resource set (CORESET)). If the bandwidth of the CORESET is greater than the bandwidth supported by the NR-lite UE, the NR-lite UE may not monitor all the SIB1, and thus determine that the access of the corresponding cell is barred. The NR-lite UE may attempt the camping by searching for another cell within the same carrier frequency. Additionally, as in the above-described subCarrierSpacingCommon, the NR-lite UE may determine that the corresponding carrier frequency is all barred, stop the cell search of the corresponding carrier frequency, and attempt the camping by searching for another cell of another carrier frequency.

In some embodiments, the NR-lite UE may determine whether the NR-lite UE accesses or not based on the intraFreqReselection value. According to an embodiment, if passing all of the above conditions (e.g., subCarrierSpacingCommon condition, pdcch-ConfigSIB1 condition), the NR-lite UE may determine whether the NR-lite UE may access the corresponding cell based on the intraFreqReselection value. For example, according to the current NR standard, values of the cellBarred field and the intraFreqReselection field may be configured as shown in the following [Table 3].

TABLE 3

| cellBarred | intraFreqReselection |
|---|---|
| barred | allowed |
| barred | notAllowed |
| notBarred | Not used |

That is, if cellBarred is indicated as notBarred, the intraFreqReselection value is not used. Accordingly, in some embodiments of the present disclosure, if cellBarred is indicated as notBarred, the gNB may explicitly notify that the corresponding cell of the gNB is a cell supporting the NR-lite UE, by setting the intraFreqReselection value to allowed. By contrast, by setting cellBarred to indicate notBarred and setting the intraFreqReselection value to notAllowed, the gNB may explicitly notify that the corresponding cell of the gNB is a cell not supporting the NR-lite UE.

In some embodiments, the NR-lite UE may explicitly notify the cell supporting NR-lite, by utilizing the remaining 1-bit spare field instead of the intraFreqReselection field.

In FIG. 6, it is described that the NR-lite UE determines whether the corresponding cell is the cell accessible to the NR-lite UE based on the MIB, and performs a subsequent operation (e.g., SIB1 reception operation of step 617) on the assumption that the cell is accessible, but the present disclosure is not limited thereto. According to an embodiment, the NR-lite UE may determine that the cell on which the NR-lite UE is camped, that is, the cell providing the MIB is a cell inaccessible by the NR-lite UE. That is, the operation in which the NR-lite UE determines that the corresponding cell does not support the NR-lite UE based on the MIB may also be understood as an embodiment of the present disclosure.

In step 617, the NR-lite UE may receive SIB1. If determining that the cell is not barred by reading the MIB (i.e., decoding the MIB) through the above procedures, the NR-lite UE may receive the SIB1 based on the aforementioned pdcch-ConfigSIB1 information. The SIB1 may include serving cell information (e.g., Servingcellcommon). The serving cell information may include downlink BWP information and uplink BWP information. The downlink BWP and the uplink BWP may be used to perform subsequent transmission/reception procedures.

In step 619, the UE may acquire BWP information for the NR-lite UE. Since the bandwidth of the initial downlink (DL) BWP is the same as the bandwidth (the bandwidth of Coreset 0) notified with pdcch-ConfigSIB1 in the NR, a separate initial DL BWP for the NR-lite UE is not required. However, in some embodiments, for subsequent operations of the NR-lite UE, the gNB may need to provide separate initial DL BWP information to the NR-lite UE. In the initial uplink (UL) BWP, the NR-lite UE may not identify the bandwidth using only the MIB information of step 613. Hence, the NR-lite UE may identify the initial UL BWP through information transmitted in the SIB 1.

In detailed information of the initial UL BWP which is the information transmitted in the SIB1, if the bandwidth of the initial UL BWP is greater than the bandwidth of the cell supportable by the NR-lite UE, the UE may identify whether there is a separate initial UL BWP (may be referred to as initialUplinkBWP2 or initialUplinkBWP-NR-Lite) for the NR-lite UE.

If the bandwidth of the initial UL BWP is greater than the bandwidth of the cell supportable by the NR-lite UE and there is no separate initial UL BWP, the NR-lite UE considers that the corresponding cell is barred and attempts the camping by searching for another cell within the same frequency. Alternatively, the NR-lite UE may assume that all the cells of the corresponding frequency do not support the NR-lite UE, stop the cell search of the corresponding carrier frequency and attempt the camping by searching for another cell of another carrier frequency.

Alternatively, if the separate initial UL BWP is not defined, if the bandwidth of the initial UL BWP is greater than a bandwidth of the cell supportable by the NR-lite UE, the NR-lite UE considers that the corresponding cell is barred, and attempt the camping by searching for another cell of the same carrier frequency. Alternatively, assuming that all the cells of a corresponding carrier frequency do not support the NR-lite UE, the NR-lite UE may stop the cell search of the corresponding carrier frequency and attempt the camping by searching for another cell of another carrier frequency.

If the separate initial DL/UL BWP is defined, the gNB may inform all of initialDownlinkBWP2, initialUplinkBWP2, PDCCH-ConfigCommon2 (coreset and searchspace), and the like to the NR-lite UE in the cell. In addition, the gNB may separately inform the NR-lite UE of BCCH configuration information used for the SIB transmission and PCCH configuration information used for paging transmission. At this time, according to an embodiment, initialDownlinkBWP2 may be formed as a subset of initial-DownlinkBWP, only locationAndBandwidth information is different and the remaining parameters (SubcarrierSpacing, pdcch-ConfigCommon, etc.) may be jointly used between the NR-lite UE and a general UE (i.e., other UE than the NR-lite UE). That is, only the locationAndBandwidth information is signaled in initialDownlinkBWP2, the remaining parameters utilize information in the existing initialDownlinkBWP, and thus signaling overhead may be reduced. This may be applied equally to initialUplinkBWP. For example, initialUplinkBWP2 is formed as a subset of initialUplinkBWP, only the locationAndBandwidth information is different and the remaining parameters (SubcarrierSpacing, pdcch-ConfigCommon, etc.) may be jointly used the NR-lite UE and the general UE (i.e., other UE than the NR-lite UE).

In step 621, the NR-lite UE may receive the NR-lite UE related system information. Herein, the NR-lite UE related system information may indicate system information (e.g., SIB2, SIB3, SIB4) received after the SIB1 and including information dedicated to the NR-lite UE. If the NR-lite UE determines whether the access is possible through the MIB and the SIB1 and determines that the corresponding cell is not barred to the NR-lite UE, the UE may receive other SIB information from the corresponding cell. In some embodiments, the other SIB information, that is, the NR-lite UE related system information separately indicates which cells for intra-frequency (same frequency) or inter-frequency (different frequency) supports the NR-lite UE or not, and thus may be used to reselect a cell for the NR-lite UE if the UE reselects the cell or hands over due to a signal strength change or a channel status change. According to an embodiment, the NR-lite UE may perform intra-frequency measurement or inter-frequency measurement. In so doing, a cell not supporting the NR-lite UE among neighboring cells of the system information may be excluded from measurement targets. In addition, according to an embodiment, if transmitting a measurement report, the NR-lite UE may exclude the cell not supporting the NR-lite UE from reporting targets. In addition, according to an embodiment, if the UE performs the measurement according to a measurement configuration, it may exclude the cell not supporting the NR-lite UE from measurement objects.

Step 621 is illustrated to explain the system information for the NR-lite UE, but the present disclosure is not limited thereto. According to an embodiment, system information following the SIB1 may not include separate information for the NR-lite UE. That is, step 621 may be omitted.

In step 623, the NR-lite UE may receive paging. If the NR-lite UE is in the idle mode (e.g., RRC_IDLE), the NR-lite UE may receive the paging. Next, the NR-lite UE may switch back to the connected mode (e.g., RRC_CONNECTED), by receiving a paging message from the corresponding cell. The NR-lite UE may access the network through the random access procedure, and identify whether there is downlink data coming from the network. The description of the procedure of FIG. 4 mentioned above or FIG. 7 to be described may be applied to the random access procedure in the same or similar manner. Alternatively, according to an embodiment, to reduce the signaling overhead, the random access procedure may adopt a 2-step RACH procedure including a message A (MSG A) transmission instead of the MSG 1 and the MSG 3 of the 4-step RACH procedure, and an MSG B transmission instead of the MSG 2 and the MSG 4 of the 4-step RACH procedure.

FIG. 6 illustrates that step 623 is performed after step 621, but the present disclosure is not limited thereto. The NR-lite UE may receive the paging if the NR-lite UE is in the idle mode.

FIG. 6 has described the procedures of the NR-lite UE for receiving the system information (e.g., MIB, SIB1) from the cell, and determining whether the cell supports the NR-lite UE based on the system information. However, according to an embodiment, the cell of the present disclosure may support the general UE as well as the NR-lite UE. Accordingly, even if other general UE than the NR-lite UE receives information (e.g., initialDownlinkBWP2) for the NR-lite UE, ignoring or discarding the information may also be understood as an embodiment of the present disclosure.

The UE receiving the system information required for the access may transit to the RRC connected mode through the random access procedure. Hereafter, an embodiment of performing the random access procedure of the NR-lite UE will be described in FIG. 7.

Figure 7:
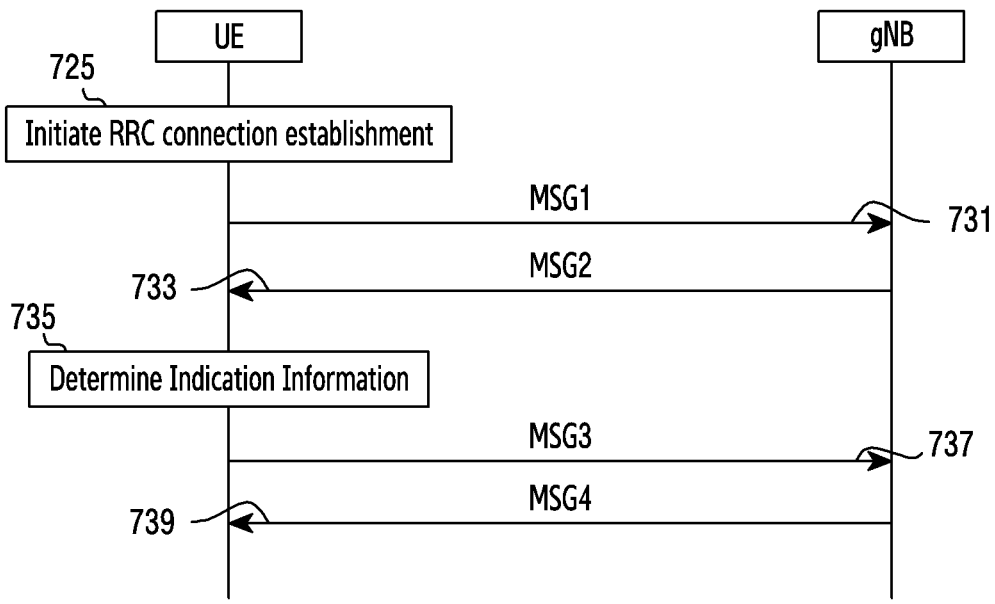
FIG. 7 illustrates an example of a random access procedure of an NR-lite terminal in a wireless communication system according to various embodiments of the present disclosure.

FIG. 7 illustrates an example of a random access procedure of an NR-lite UE in a wireless communication system according to various embodiments of the present disclosure.

Referring to FIG. 7, in step 725, the NR-lite UE may initiate RRC connection establishment. For example, if the UE receives a paging message from a cell and needs to receive downlink data, or if uplink data to transmit occurs, it may determine to transit to the RRC_CONNECTED mode for corresponding data transmission/reception. The NR-lite UE may perform the random access. At this time, the UE may operate as follows, if the NR-lite UE and the general NR UE perform the random access with the same initial DL BWP and initial UL BWP and the same random access parameters.

In step 731, the NR-lite UE may transmit an MSG 1 to the gNB. The NR-lite UE may transmit a random access preamble.

In step 733, the gNB may transmit an MSG 2 to the NR-lite UE. The gNB may transmit an RAR to the NR-lite UE. The NR-lite UE may receive the RAR. The NR-lite UE may acquire uplink resources for MSG 3 transmission from the RAR from the gNB.

In step 735, the NR-lite UE may determine indication information. The NR-lite UE may determine the indication information according to whether it is necessary to inform the gNB of whether the UE performing the random access procedure is an NR-lite UE. For example, since the NR-lite UE is limited in the data rate for transmission and reception, it is necessary to notify the NR-lite UE in this random access step, before the gNB transmits capability information of the UE not to randomly transmit data to the UE. Hence, the NR-lite UE may determine the indication information notifying the NR-lite UE.

The indication information may be expressed in various manners. In some embodiments, the NR-lite UE may select the following logical channel identifier (LCD) according to the type of the message to transmit in the MSG 3, and transmit the MSG 3 based on the selected LCID.

LCID A: used by the NR-lite UE (i.e., a UE limited in BW and max TB size) to transmit a 48-bit common control channel (CCCH) service data unit (SDU) message.

LCID B: used to transmit a 48-bit CCCH SDU message.

LCID C: used to transmit a 64-bit CCCH SDU message.

(A, B, and C are designated integer values defined by the standard, and are marked as A, B, and C for convenience of description).

If the CCCH SDU to transmit in the MSG 3 is RRCSetupRequest, the UE selects and reports one of LCID A and LCID B, and selects LCID A if the UE is the NR-lite UE.

In addition, if the CCCH SDU to transmit in the MSG 3 is RRCResumeRequest, the UE selects and reports one of LCID B and LCID C. The RRCResumeRequest message is a message used to transit from the RRC_INACTIVE state to the RRC_CONNECTED state, there is no need to re-notify the NR-lite UE, because the gNB transits to the RRC_CONNECTED state once and informs of the NR-lite UE, and thus the NR-lite terminal merely determines the LCID according to the size of the RRCResumeRequest message.

In addition, if the CCCH SDU to transmit in the MSG 3 is RRCReestablishmentRequest, the UE selects and reports LCID B. This is for the UE of the RRC_CONNECTED state to recover from radio channel condition deterioration, and this is because the gNB which already knows the NR-lite UE does not need to re-notify of the NR-lite UE, and RRCReestablishmentRequest has a single size of 48 bits. Meanwhile, according to an embodiment, regardless of determining to notify of the NR-lite UE, if the UE performing the random access is the NR-lite UE, the NR-lite UE may always use the LCD A in the CCCH transmission.

In step 737, the NR-lite UE may transmit the MSG 3 to the gNB. The NR-lite UE may generate the MSG 3 based on the indication information determined in step 735, and transmit the MSG 3 to the gNB.

In step 739, the gNB may transmit an MSG 4 to the NR-lite UE. The NR-lite UE may transmit the MSG 3, and receive the MSG 4 for identifying whether the corresponding MSG 3 is correctly transmitted and a response message (i.e., RRCSetup/RRCResume/RRCReestablishment) of the RRC message transmitted in the MSG 3.

The present disclosure illustrates the scenario in which the LCD included in the MSG 3 notifies that the UE is the NR-lite UE, but the present disclosure is not limited thereto. That is, for example, a method of explicitly notifying by utilizing a spare bit of the RRC message included in the MSG 3 besides the LCD may be also considered. Also, a method of explicitly notifying of the NR-lite UE through a separate value in establishmentCause of the RRCSetupRequest message may also be considered.

Meanwhile, unlike the above description, if a different initial UL BWP initialDownlinkBWP2 is set at the NR-lite UE, or if the same initial DL BWP and initial UL BWP are used but the random access related parameters are set differently, the NR-lite UE may not need to separately notify in the MSG 3 that the corresponding UE is the NR-lite UE. For example, every uplink transmission transmitted by the UE may be the initial UL BWP separated from the transmission of the general UE, or the random access resource may be the PRACH resource separated from the transmission of the general UE. Hence, the gNB may obtain that the corresponding UE is the NR-lite UE by receiving only the MSG 1.

Instead, the gNB may set a separate search space for NR-lite UEs using initialDownlinkBWP2 for the MSG 2 reception. Alternatively, the gNB may distinguish the preamble transmission of the MSG 1 and set the search space in initialDownlinkBWP2. In this case, since the random access preamble is different even if the NR-lite UE receives the MSG 2, the NR-lite UE may receive the response to the random access preamble with respect to the NR-lite UE without confusing with a response to the random access preamble of the general UE.

In addition, according to an embodiment, the gNB may distinguish the NR-lite UE and the general UE, by adding an offset for the NR-lite UEs to the RA-RNTI which scrambles the PDCCH used in the MSG2 transmission. The NR-lite UE may identify whether the received RAR is the response to the random access preamble of the NR-lite UE, by applying the designated offset to the RA-RNTI and receiving the RAR. That is, the NR-lite UE may acquire a new identifier by applying the designated offset to the RA-RNTI. The NR-lite UE may identify whether the received RAR is the response to the random access preamble of the NR-lite UE, by identifying whether the RAR is masked with the new identifier.

In addition, according to an embodiment, the gNB may also consider a method for including an indicator which explicitly notifies that this scheduling is for NR-lite UEs into information included in the PDCCH used in the MSG2 transmission. The NR-lite UE may obtain the indicator by decoding the PDCCH, and identify from the indicator whether the RAR received is the response to the random access preamble of the NR-lite UE.

Figure 8:
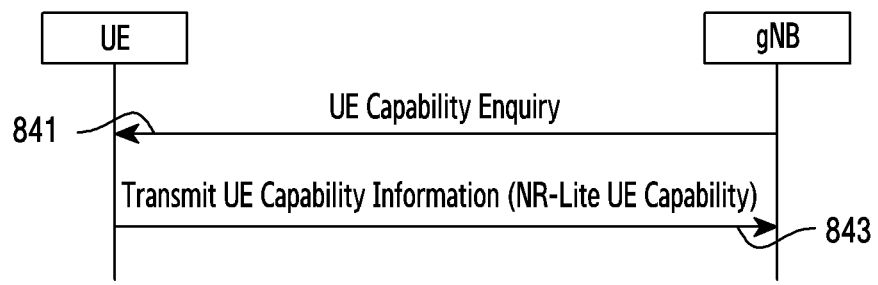
FIG. 8 illustrates an example of a capability information transmission procedure of an NR-lite terminal in a wireless communication system according to various embodiments of the present disclosure.

FIG. 8 illustrates an example of a capability information transmission procedure of an NR-lite UE in a wireless communication system according to various embodiments of the present disclosure. The capability information of the NR-lite UE is UE capability information, and may include restrictions on the NR-lite UE.

Referring to FIG. 8, in step 841, the gNB may transmit a UE capability enquiry message to the NR-lite UE. If the NR-lite UE has never accessed the network and the core network (the MME of the LTE or the AMF of the NR) has no capability information of the UE, the core network may command the gNB to receive the UE capability information. Hence, the gNB may transmit the UE capability enquiry message requesting the capability information to the NR-lite UE.

In step 843, the NR-lite UE may transmit the UE capability information to the gNB. If receiving the request for transmission of the UE capability information from the gNB, the NR-lite UE may transmit the capability information to the gNB.

The UE capability information of the NR-lite UE may be configured in various manners. In some embodiments, the UE capability information of the NR-lite UE may include 1-bit information (e.g., the NR-lite is set to {supported}) indicating the characteristic (the limited SCS/BW/transport block (TB) size) of the NR-lite UE described above. For example, the 1-bit information may indicate the UE transmitting the UE capability information is the NR-lite UE, the SCS of the NR-lite UE is a designated value (e.g., 15 kHz), the bandwidth of the NR-lite UE is a designated value (e.g., 10 MHz), and the maximum value (e.g., 5000 bits) of the TB size of the NR-lite UE. If supporting the NR-lite UE, the gNB may configure system information according to the designated values, and perform the scheduling.

In some other embodiments, the UE capability information of the NR-lite UE may include at least one information element (IE). At least one IE may be an IE which exists identically in the UE capability information of the general UE. According to a value indicated by the at least one IE, the gNB may determine that the UE transmitting the capability information is the NR-lite UE. In other words, the NR-lite UE may indicate that the UE transmitting the UE capability information is the NR-lite UE indirectly through at least one IE. For example, based on at least one or a combination of the supported SCS value, the supported frequency band value, and the BWP related capability information included in the UE capability information, it may indicate that the UE is NR-lite UE. As another example, it may indicate that the UE is the NR-lite UE through a spare value (spare 1) of the IE (e.g., RAT-Type) included in the UE capability information.

To handover a corresponding UE from the current gNB to another gNB, the gNB may identify whether the UE requiring the handover is an NR-lite UE by utilizing the capability information. If the UE is the NR-lite UE, the gNB may initiate the handover only if the target gNB supports the NR-lite UE.

The UE capability enquiry procedure has been illustrated in FIG. 8, but the capability information transmission procedure of the present disclosure is not limited thereto. According to an embodiment, the operation of the NR-lite UE for transmitting the capability information of the step 843 may also be understood as an embodiment of the present disclosure, without the step 841 of transmitting the enquiry message of the gNB.

Figure 9:
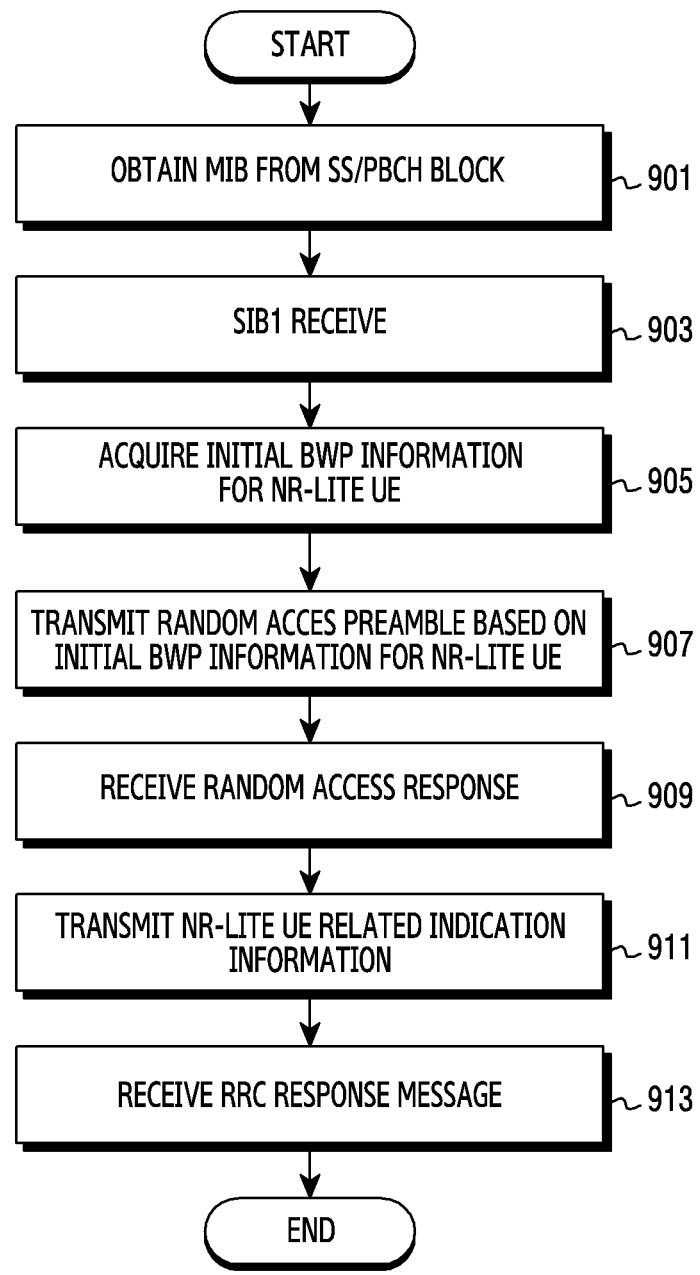
FIG. 9 illustrates an operation flow of an NR-lite terminal for accessing a network in a wireless communication system according to various embodiments of the present disclosure.

FIG. 9 illustrates an operation flow of an NR-lite UE for accessing a network in a wireless communication system according to various embodiments of the present disclosure.

Referring to FIG. 9, the NR-lite UE may obtain the MIB from the SS/PBCH block in step 901. This drawing may assume that the NR-lite UE is in the idle mode RRC_IDLE state without the connection to the gNB, and may camp on the gNB where a signal is detected to receive data transmitted from the network. In other words, the NR-lite UE may camp on any cell, to receive system information. The NR-lite UE may attempt to receive the SS/PBCH block in an arbitrary carrier frequency. The NR-lite UE may receive the SS/PBCH block of the cell. The SS/PBCH block may include the MIB according to the PBCH transmission in addition to the synchronization signal. The NR-lite UE may acquire the MIB of the corresponding cell. The structure of the MIB may be configured as shown in [Table 4].

TABLE 4

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

At this time, the NR-lite UE primarily determines whether the cell is accessible by the NR-lite UE using information included in the MIB. The determination method is as follows.

The NR-lite UE first determines whether the access is possible with subCarrierSpacingCommon of the MIB. That is, if supporting only 15 kHz for the SCS, the NR-lite UE may determine whether the subCarrierSpacingCommon value is scs15or60, for scs30or120, consider that the access for the corresponding cell is barred by determining a subsequent SCS such as SIB1 as 30 kHz, and attempt the camping by searching for another cell within the same carrier frequency. In so doing the NR-lite UE may determine that all cells of the corresponding carrier frequency do not support the NR-lite UE, or may stop the cell search in the corresponding carrier frequency by assuming it. Next, the NR-lite UE may attempt the camping by searching for another cell of another frequency.

In addition, even if the SCS value supports 15 kHz, the NR-lite UE may additionally determine whether the corresponding cell is accessible based on other information in the MIB. For example, the NR-lite UE identifies pdcch-ConfigSIB1 and determines whether additional access is possible. The pdcch-ConfigSIB1 notifies the resource set for monitoring the PDCCH scheduled for the SIB 1. (This is referred to as CORESET.) If the bandwidth of the CORESET is greater than the bandwidth supported by the NR-lite UE, the UE, which may not monitor every SIB1, may consider that the access of the corresponding cell is barred, and attempt the camping by searching for another cell within the same carrier frequency. In the same manner as the above-described subCarrierSpacingCommon, if determining that the corresponding carrier frequency is all barred, the NR-lite UE may stop the cell search of the corresponding carrier frequency and attempt the camping by searching for another cell of another carrier frequency.

Meanwhile, the aforementioned embodiment describes the condition for subCarrierSpacingCommon (hereafter, a first condition) and the condition for pdcch-ConfigSIB1 (hereafter, a second condition), and describes that the first condition is satisfied and then whether the second condition is satisfied is determined, but the present disclosure is not limited thereto. According to an embodiment, the NR-lite UE may determine whether the corresponding cell supports the NR-lite UE based on the second condition alone. Also, according to an embodiment, the NR-lite UE may determine that the corresponding cell supports the NR-lite UE, if both conditions are satisfied regardless of the determination order of the first condition and the second condition. Further, other field values in the system information besides the above-described first condition and second condition may be additionally used to determine whether the corresponding cell supports the NR-lite UE.

The NR-lite UE may determine whether the NR-lite UE accesses the corresponding cell by additionally utilizing the existing intraFreqReselection value. That is, if both the first condition and the second condition described above are satisfied, the NR-lite UE may determine whether the NR-lite UE accesses the corresponding cell. According to the current NR standard, values of the cellBarred field and the intraFreqReselection field may be set as shown in the following [Table 5].

TABLE 5

| cellBarred | intraFreqReselection |
|---|---|
| barred | allowed |
| barred | notAllowed |
| notBarred | Not used |

That is, if cellBarred is indicated as notBarred, the intraFreqReselection value is not used. Hence, the present invention may set the intraFreqReselection value to allowed if cellBarred is indicated as notBarred and thus notify that the corresponding cell is the cell supporting the NR-lite UE. By contrast, cellBarred may indicate notBarred and the intraFreqReselection value may be set to notAllowed to thus notify that the corresponding cell is the cell not supporting the NR-lite UE.

According to another embodiment, the NR-lite UE may determine whether the corresponding cell supports the NR-lite UE based on the intraFreqReselection value, independently of the first condition and the second condition as above described.

Alternatively, by utilizing the remaining 1-bit spare field instead of the intraFreqReselection field, the gNB may inform that the corresponding cell is the cell supporting NR-lite. The conditions for determining whether the cell attempted for the access may service the NR-lite UE based on the MIB have been described in step 911. Although the above conditions have been described in series, modifications may be made within a range which is easy for those skilled in the art. For example, if any one of the above-described values indicates that the corresponding cell supports the NR-lite UE, the NR-lite UE may determine that the corresponding cell supports the NR-lite UE.

In step 903, the NR-lite UE may receive SIB1. If the NR-lite UE decodes the MIB and determines that the corresponding cell is not barred, it may receive the SIB1 based on pdcch-ConfigSIB1 information of the MIB.

According to an embodiment, the bandwidth of the initial DL BWP, which is the same as the bandwidth (the bandwidth of Coreset 0) notified by pdcch-ConfigSIB1, may not require a separate initial DL BWP for the NR-lite UE in the NR. In this case, the NR-lite UE may share the initial DL BWP value with the general UE. However, nevertheless, depending on options to be described, separate initial DL BWP information may be required for a subsequent operation of the NR-lite UE. According to another embodiment, the gNB may provide bandwidth information (e.g., initial DL BWP2) dedicated to the NR-lite UE to the NR-lite UE through the SIB 1.

In step 905, the NR-lite UE may acquire initial BWP information for the NR-lite UE. The initial BWP information for the NR-lite UE may be the same as the initial BWP information of the general UE, or may be BWP information separately configured by the gNB.

In the initial UL BWP, the bandwidth may not be identified using only the information of the MIB. Hence, the NR-lite UE may identify the initial UL BWP through information transmitted in the SIB 1.

The NR-lite UE may determine whether the corresponding cell serves the NR-lite (i.e., supports the NR-lite UE) based on the initial UL BWP. In some embodiments, in detailed information of the initial UL BWP which is the information transmitted in the SIB1, if the bandwidth of the initial UL BWP is greater than a cell supportable by the NR-lite UE, the UE identifies whether there is a separate initial UL BWP (initialUplinkBWP2/initialUplinkBWP-NR-Lite) for the NR-lite UE. If the bandwidth of the initial UL BWP is greater than the cell supportable by the NR-lite UE and there is no separate initial UL BWP, the NR-lite UE considers that the corresponding cell is barred, and attempts the camping by searching for another cell within the same carrier frequency. By determining or assuming that all cells of the corresponding carrier frequency do not support the NR-lite UE, the NR-lite UE may stop the cell search of the corresponding carrier frequency. The NR-lite UE may attempt the camping by searching for another cell of another carrier frequency.

Alternatively, in some embodiments, if the separate initial UL BWP for the NR-lite UE is not defined, if the bandwidth of the initial UL BWP is greater than the cell supportable by the NR-lite UE, the UE considers that the corresponding cell is barred, and attempt the camping by searching for another cell within the same frequency. Alternatively, by assuming that all the cells of the corresponding frequency do not support the NR-lite UE, it may stop the search of every cell of the corresponding frequency and attempt the camping by searching for another cell of another frequency.

In some embodiments, if the separate initial DL/UL BWP is used, the gNB may inform each of initialDownlinkBWP2, initialUplinkBWP2, PDCCH-ConfigCommon2 (coreset and searchspace), and so on, and separately inform even the BCCH configuration information used for the SIB transmission and the PCCH configuration information used for the paging transmission for the NR-lite UE. At this time, initialDownlinkBWP2 may be formed as a subset of initialDownlinkBWP, and the NR-lite UE and the general UE may have different locationAndBandwidth information and jointly use the remaining parameters (SubcarrierSpacing, pdcch-ConfigCommon, etc.). That is, only the locationAndBandwidth information is signaled in initialDownlinkBWP2 and the remaining parameters utilize information of the existing initialDownlinkBWP for the general UE, thus reducing the signaling overhead. This may be equally applied to initialUplinkBWP. That is, only the locationAnd- Bandwidth information is different, and the NR-lite UE and the general UE may share other information of the initialUplinkBWP.

Although not depicted in FIG. 9, if determining whether the access is possible through the MIB and the SIB1 and determining that the cell is not barred, the NR-lite UE may receive other SIB information from the corresponding cell, and the other SIB information may include information separately indicating which cells for intra-frequency (same frequency) or inter-frequency (different frequency) supports the NR-lite UE or not supports the NR-lite UE or not. If reselecting the cell or handing over due to a signal strength change, collapse of a corresponding cell, a channel status change, the NR-lite UE may more effectively access the network through the other SIB information. As an example, the other SIB information may be used to reselect the cell supporting the NR-lite. Alternatively, the NR-lite UE may start receiving a paging message from the corresponding cell and identify whether there is downlink data from the network.

Meanwhile, the NR-lite UE may perform an RRC connection procedure, to establish RRC connection. The NR-lite UE may perform the random access procedure.

In step 907, the NR-lite UE may transmit a random access preamble based on initial BWP information for the NR-lite UE. If the NR-lite UE and the general NR UE perform the random access with the same initial DL BWP and initial UL BWP and the same random access parameters, the UE may operate as follows.

In step 909, the NR-lite UE may receive a random access response. The gNB may transmit the random access response, in response to the random access preamble of the NR-lite UE.

In step 911, the NR-lite UE may transmit an MSG 3 for the NR-lite UE. The NR-lite UE may acquire uplink resources for the MSG 3 transmission by receiving the RAR from the gNB. Next, the NR-lite UE, which is limited in the data rate for transmission and reception, needs to inform the NR-lite UE in this random access step, before transmitting the UE capability information to block the gNB from randomly transmitting data, and accordingly the UE may transmit the MSG 3, by selecting the following LCID depending on the type of the message to transmit in the MSG 3.

LCID A: used by the NR-lite UE (i.e., a UE restricted in BW and max TB size) transmit a 48-bit CCCH SDU message.

LCID B: used to transmit a 48-bit CCCH SDU message.

LCID C: used to transmit a 64-bit CCCH SDU message.

(The A, B, and C are designated integer values defined by the standard and are marked as A, B, and C for convenience.)

Hence, the UE selects and reports one of LCID A and LCD B if the CCCH SDU to transmit in the MSG 3 is RRCSetupRequest, and selects LCD A if the UE is the NR-lite UE.

In addition, if the CCCH SDU to transmit in the MSG 3 is RRCResumeRequest, one of LCD B and LCD C is selected and reported. The RRCResumeRequest message is a message used to transit from the RRC_INACTIVE state to the RRC_CONNECTED state, there is no need to re-notify the NR-lite UE, and it is determined according to the size of the RRCResumeRequest message, because the gNB has already entered the RRC_CONNECTED state and notified the NR-lite UE.

In addition, if the CCCH SDU to transmit in the MSG 3 is RRCReestablishmentRequest, the UE selects and reports LCD B. This is for the UE of the RRC_CONNECTED state to recover from radio channel condition deterioration, and this is because there is no need to re-notify the NR-lite UE because the gNB already knows the NR-lite UE, and the RRCReestablishmentRequest has the 48-bit single size.

Alternatively, the NR-lite UE may consider a scenario in which LCID A is always used in the CCCH transmission.

In step 913, the NR-lite UE may receive an RRC response message. In response to the MSG 3 transmission, the NR-lite UE may receive the MSG 4 for identifying whether the corresponding MSG 3 has been correctly transmitted. For example, the NR-lite UE may receive a response message (i.e., RRCSetup/RRCResume/RRCReestablishment) of the RRC message transmitted in the MSG 3.

The embodiment in which the LCID included in the MSG 3 notifies that the UE is the NR-lite UE has been described, but the UE performing the random access attempt through the MSG 3 may indicate the NR-lite UE to the gNB in other manners. For example, the NR-lite UE may explicitly notify that the MSG 3 is the MSG 3 of the NR-lite UE, by utilizing the spare bit of the RRC message included in the MSG 3. In addition, for example, the NR-lite UE may explicitly notify that the UE attempting the random access is the NR-lite UE by using a separate value in establishmentCause in the RRCSetupRequest message.

Meanwhile, according to an embodiment, if a different initial UL BWP (initialDownlinkBWP2) is set for the NR-lite UE, or if the same initial DL BWP and initial UL BWP are used but the random access related parameters are differently set, the UE may not need to separately inform that the corresponding UE is the NR-lite UE through the MSG 3. For example, every uplink transmission transmitted by the UE may be the initial UL BWP separated from the transmission of the general UE. Alternatively, for example, the random access resource may be the PRACH resource separated from the transmission of the general UE. In this case, the gNB receives only the MSG 1 of the NR-lite UE, and may obtain that the UE transmitting the MSG 1 is the NR-lite UE.

Instead, the gNB may set a separate search space for the MSG2 reception to the NR-lite UE using the initial DL BWP2. Alternatively, the preamble transmission of the MSG 1 may be distinguished and set in initialDownlinkBWP2. In this case, since the identifier of the random access preamble transmitted in the MSG 2 reception is different, the NR-lite UE may receive the MSG 2 without confusion with the general UE. Alternatively, the gNB may distinguish the MSGs 2 of the two UEs respectively, by adding an offset for the NR-lite UEs to the RA-RNTI used to scramble the PDCCH in the MSG 2 transmission. Alternatively, the gNB may include an indicator explicitly indicating that this scheduling is for the NR-lite UEs in the information included in the PDCCH used in the MSG 2 transmission.

Although not depicted in FIG. 9, if the NR-lite UE has never accessed the network and the core network (the MME of the LTE or the AMF of the NR) has no UE capability information, the core network may command the gNB to receive the UE capability information. The gNB may request UE capability information transmission from the NR-lite UE. If receiving the request, the NR-lite UE may transmit the UE capability information to the gNB. At this time, the NR-lite UE may indicate that the UE transmitting the UE capability information to the gNB is the NR-lite UE, by including a specific field (or a specific value) in the capability information. For example, the NR-lite UE may inform the capability with 1-bit information including the characteristics (the limited SCS/BW/TB size) of the NR-lite as described above. Thus, to hand over the corresponding UE to another gNB, the gNB may perform the handover only if the target gNB supports the NR-lite UE by utilizing the corresponding 1-bit information.

FIG. 9 has described that the random access procedure is performed in the initial access step, but the descriptions of step 907 through step 913 may be conducted in other procedure than the initial access. For example, if the paging message is received from the cell and downlink data is to be received, or if uplink data to transmit occurs, the NR-lite UE needs to transit to the RRC_CONNECTED mode for the corresponding data transmission and reception, and may perform the random access for this.

Figure 10:
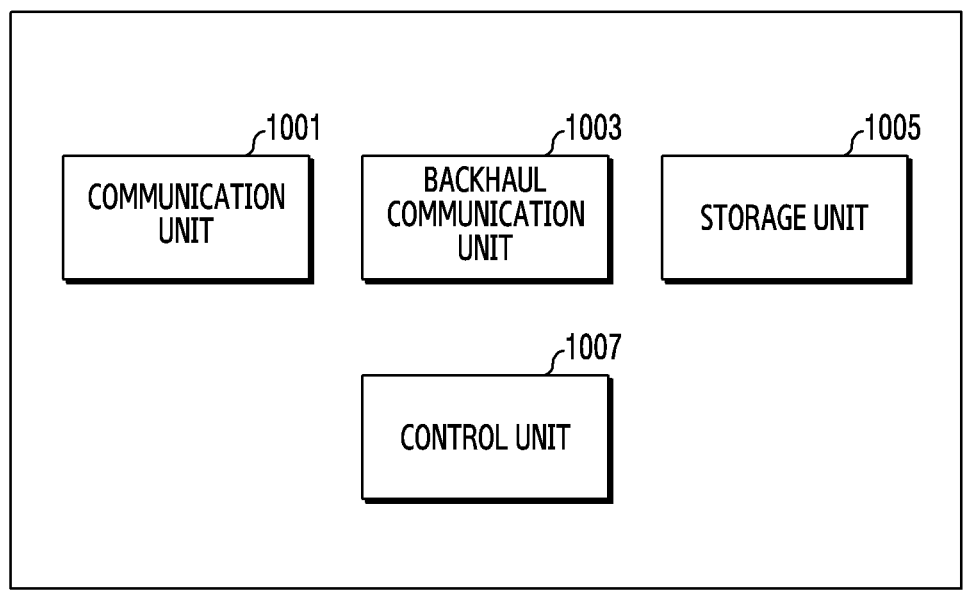
FIG. 10 illustrates a functional configuration of a base station in a wireless communication system according to various embodiments of the present disclosure.

FIG. 10 illustrates a functional configuration of a base station in a wireless communication system according to various embodiments of the present disclosure. A term such as ' . . . unit' or '~er' used hereafter indicates a unit for processing at least one function or operation, and may be implemented using hardware, software, or a combination of hardware and software.

Referring to FIG. 10, the base station includes a wireless communication unit 1001, a backhaul communication unit 1003, a storage unit 1005, and a control unit 1007.

The wireless communication unit 1001 performs functions for transmitting and receiving a signal over the radio channel. For example, the wireless communication unit 1001 performs a conversion function between a baseband signal and a bit string according to the physical layer standard of the system. For example, in data transmission, the wireless communication unit 1001 generates complex symbols by encoding and modulating a transmit bit string. In addition, in data reception, the wireless communication unit 1001 restores a received bit string by demodulating and decoding a baseband signal. In addition, the wireless communication unit 1001 upconverts a baseband signal into a radio frequency (RF) band signal and then transmits it via an antenna, and down-converts an RF band signal received via the antenna into a baseband signal.

For doing so, the wireless communication unit 1001 may include a transmit filter, a receive filter, an amplifier, a mixer, an oscillator, a digital to analog convertor (DAC), an analog to digital convertor (ADC), and the like. In addition, the wireless communication unit 1001 may include a plurality of transmit/receive paths. Further, the wireless communication unit 1001 may include at least one antenna array including a plurality of antenna elements. In terms of hardware, the wireless communication unit 1001 may include a digital unit and an analog unit, and the analog unit may include a plurality of sub-units according to an operating power and an operating frequency. According to various embodiments, the wireless communication unit 1001 may include a unit for forming a beam, that is, a beamforming unit. For example, the wireless communication unit 1001 may include a massive multiple input multiple output (MIMO) unit (MMU) for the beamforming.

The wireless communication unit 1001 may transmit or receive the signal. For doing so, the wireless communication unit 1001 may include at least one transceiver. For example, the wireless communication unit 1001 may transmit a synchronization signal, a reference signal, system information, a message, control information, data, or the like. Also, the wireless communication unit 1001 may perform the beamforming. To give directivity based on the configuration of the control unit 1007 to the signal to transmit or to receive, the wireless communication unit 1001 may apply a beamforming weight to the signal. According to an embodiment, the wireless communication unit 1001 may generate a baseband signal according to a scheduling result and a transmit power calculation result. In addition, the RF unit in the wireless communication unit 1001 may transmit the generated signal via the antenna.

The wireless communication unit 1001 transmits and receives the signals as stated above. Hence, whole or part of the wireless communication unit 1001 may be referred to as 'a transmitter', 'a receiver', or 'a transceiver'. Also, in the following, the transmission and the reception over the radio channel is used as the meaning which embraces the above-stated processing of the wireless communication unit 1001.

The backhaul communication unit 1003 provides an interface for communicating with other nodes in the network. That is, the backhaul communication unit 1003 converts a bit sting transmitted from the base station to other node, for example, other access node, another base station, an upper node, or a core network, into a physical signal, and converts a physical signal received from the other node into a bit string.

The storage unit 1005 stores a basic program for operating the base station, an application program, and data such as setting information. The storage unit 1005 may include a memory. The storage unit 1005 may include a volatile memory, a non-volatile memory, or a combination of a volatile memory and a non-volatile memory. The storage unit 1005 provides the stored data at a request of the control unit 1007. According to an embodiment, the storage unit 1005 may include a UE information management unit including UE information. The UE information may include capability information of each UE (e.g., whether it is an NR-lite UE). If the UE rea-accessing is the NR-lite UE through the storage unit, the gNB may transmit a signal or allocate resources based on the restrictions of the NR-lite UE.

The control unit 1007 controls general operations of the base station. For example, the control unit 1007 transmits and receives signals through the wireless communication unit 1001 or the backhaul communication unit 1003. Also, the control unit 1007 records and reads data in and from the storage unit 1005. The control unit 1007 may execute the functions of the protocol stack requested by the communication standard. For doing so, the control unit 1007 may include at least one processor. According to various embodiments, the control unit 1007 may control the base station to carry out operations according to the various embodiments described above. According to an embodiment, the gNB may determine that the UE performing the access procedure is the NR-lite UE. In addition, according to an embodiment, the gNB may schedule the NR-lite UE according to the conditions (e.g., the SCS, the TB size, the BW size) required for the NR-lite UE.

The configuration of the base station 110 shown in FIG. 10 is only an example of the base station, and the example of the base station carry out various embodiments of the present disclosure is not limited from the configuration shown in FIG. 10. That is, some configuration may be added, deleted, or changed according to various embodiments.

FIG. 10 describes the base station as one entity, but the present disclosure is not limited thereto. The base station according to various embodiments of the present disclosure may be implemented to build an access network having the distributed deployment as well as the integrated deployment. According to an embodiment, the base station may be divided into a central unit (CU) and a digital unit (DU), and may be implemented such that the CU performs the upper layers (e.g., PDCP, RRC) and the DU performs the lower layers (e.g., MAC, PHY). The DU of the base station may build beam coverage on the radio channel.

Figure 11:
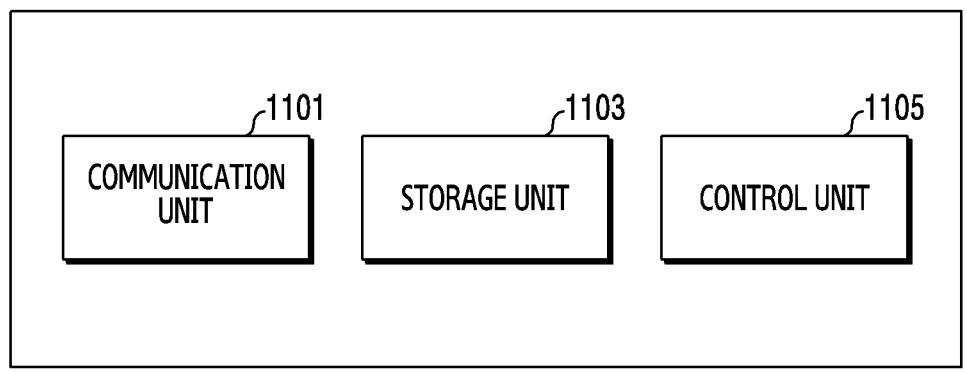
FIG. 11 illustrates a functional configuration of a terminal in a wireless communication system according to various embodiments of the present disclosure.

FIG. 11 illustrates a functional configuration of a terminal in a wireless communication system according to various embodiments of the present disclosure. A term such as ' . . . unit' or '~er' used hereafter indicates a unit for processing at least one function or operation, and may be implemented using hardware, software, or a combination of hardware and software. The terminal according to various embodiments may be the NR-lite UE. According to an embodiment, it may also be understood as an embodiment of the present disclosure that the general UE identifies information of the NR-lite UE and ignores or discards the information.

Referring to FIG. 11, the terminal includes a communication unit 1101, a storage unit 1103, and a control unit 1105.

The communication unit 1101 may perform functions for transmitting and receiving signals over the radio channel. For example, the communication unit 1101 performs a conversion function between a baseband signal and a bit string according to the physical layer standard of the system. For example, in data transmission, the communication unit 1101 generates complex symbols by encoding and modulating a transmit bit string. Also, in data reception, the communication unit 1101 restores a receive bit string by demodulating and decoding a baseband signal. Also, the communication unit 1101 up-converts the baseband signal to an RF band signal, transmits it via an antenna, and down-converts an RF band signal received via the antenna to a baseband signal. For example, the communication unit 1101 may include a transmit filter, a receive filter, an amplifier, a mixer, an oscillator, a DAC, an ADC, and the like.

Also, the communication unit 1101 may include a plurality of transmit and receive paths. Further, the communication unit 1101 may include an antenna unit. The communication unit 1101 may include at least one antenna array including a plurality of antenna elements. In view of the hardware, the communication unit 1101 may include digital circuitry and analog circuitry (e.g., an RF integrated circuit (RFIC)). Herein, the digital circuitry and the analog circuitry may be implemented as a single package. Also, the communication unit 1101 may include a plurality of RF chains. The communication unit 1101 may perform the beamforming. To give the directivity to the signal to transmit or to receive according to the configuration of the control unit 1105, the communication unit 1101 may apply a beamforming weight to the signal. According to an embodiment, the communication unit 1101 may include an RF block (or an RF unit). The RF block may include first RF circuitry related to the antenna and second RF circuitry related to the baseband processing. The first RF circuitry may be referred to as RF-antenna (A). The second RF circuitry may be referred to as RF-baseband (B).

In addition, the communication unit 1101 may transmit and receive a signal. For doing so, the communication unit 1101 may include at least one transceiver. The communication unit 1101 may receive a downlink signal. The downlink signal may include a synchronization signal (SS), a reference signal (RS) (e.g., cell-specific reference signal (CRS), demodulation (DM)-RS), system information (e.g., MIB, SIB, remaining system information (RMSI), other system information (OSI)), a configuration message, control information or downlink data. In addition, the communication unit 1101 may transmit an uplink signal. The uplink signal may include a random access related signal (e.g., a random access preamble (RAP) (or Msg1, Msg3)), a reference signal (e.g., sounding reference signal (SRS), DM-RS), or a BSR.

Specifically, the communication unit 1101 may include an RF processing unit and a baseband processing unit. The RF processing unit performs functions for transmitting and receiving signals over the radio channel such as signal band conversion and amplification. That is, the RF processing unit up-converts the baseband signal provided from the baseband processing unit into an RF band signal, then transmits it via the antenna, and down-converts an RF band signal received through the antenna into a baseband signal. For example, the RF processing unit may include a transmit filter, a receive filter, an amplifier, a mixer, an oscillator, a DAC, an ADC, and the like. In FIG. 1a, only one antenna is shown, but the terminal may include a plurality of antennas. In addition, the RF processing unit may include a plurality of RF chains. Further, the RF processing unit may perform the beamforming. For the beamforming, the RF processing unit may adjust a phase and an amplitude of each of signals transmitted and received via the plurality of the antennas or antenna elements.

The baseband processing unit performs the conversion function between the baseband signal and the bit string according to the physical layer standard of the system. For example, in data transmission, the baseband processing unit generates complex symbols by encoding and modulating the transmit bit string. In addition, in data reception, the baseband processing unit restores a received bit string by demodulating and decoding the baseband signal provided from the RF processing unit. For example, according to the OFDM scheme, in the data transmission, the baseband processing unit generates complex symbols by encoding and modulating a transmit bit string, maps the complex symbols to subcarriers, and then generates OFDM symbols through inverse fast Fourier transform (IFFT) operation and CP (cyclic prefix) insertion. In addition, in the data reception, the baseband processing unit segments the baseband signal provided from the RF processing unit on the OFDM symbol basis, restores the signals mapped to the subcarriers through fast Fourier transform (FFT) operation, and then restores the receive bit string through the demodulation and the decoding.

The communication unit 1101 transmits and receives signals as described above. Accordingly, whole or part of the communication unit 1101 may be referred to as a transmitter, a receiver, or a transceiver. Further, the communication unit 1101 may include a plurality of communication modules to support a plurality of different radio access techniques. In addition, the communication unit 1101 may include different communication modules to process signals of different frequency bands. For example, the different radio access techniques may include a wireless LAN (e.g., IEEE 802.11), a cellular network (e.g., LTE), and the like. In addition, the different frequency bands may include a super high frequency (SHF) (e.g., 2.5 GHz, 5 Ghz) band, and a millimeter wave (e.g., 60 GHz) band. In addition, the communication unit 1101 may use the radio access technique of the same type on different frequency bands (e.g., the unlicensed band for licensed assisted access (LAA), citizens broadband radio service (CBRS) (e.g., 3.5 GHz)).

The storage unit 1103 stores a basic program for operating the terminal, an application program, and data such as setting information. The storage unit 1103 may include a volatile memory, a non-volatile memory, or a combination of a volatile memory and a non-volatile memory. The storage unit 1103 stores a basic program, an application program, and data such as setting information for the operations of the terminal. In particular, the storage unit 1103 may store information related to a wireless LAN node which performs the wireless communication using the wireless LAN access technique. The storage unit 1103 provides stored data at a request of the control unit 1105. According to an embodiment, the storage unit 1103 may store bandwidth information (e.g., initialDownlinkBWP2, initialUplinkBWP2) for the NR-lite UE.

The control unit 1105 controls general operations of the terminal. For example, the control unit 1105 transmits and receives the signals through the communication unit 301. Also, the control unit 1105 records and reads data in and from the storage unit 1103. The control unit 1105 may execute functions of the protocol stack required by the communication standard. For doing so, the control unit 1105 may include at least one processor. The control unit 1105 may include at least one processor or microprocessor, or may be part of a processor. In addition, part of the communication unit 1001 and the control unit 1105 may be referred to as a communication processor (CP). The control unit 1105 may include various modules for the communication. According to various embodiments, the control unit 1105 may control the terminal to carry out operations according to various embodiments to be described.

The control unit 1105 controls the general operations of the terminal. For example, the control unit 1105 transmits and receives signals through the communication unit 1101. In addition, the control unit 1105 records and reads data in and from the storage unit 1103. For doing so, the control unit 1105 may include at least one processor. For example, the control unit 1105 may include a CP for controlling the communication and an application processor (AP) for controlling the upper layer such as an application program. According to an embodiment of the present invention, the control unit 1105 may include a multi-connection processor for processing to operating in a multi-connection mode. For example, the control unit 1105 may control the terminal to perform the operations according to the various embodiments described above. According to various embodiments, the control unit 1105 determines whether the access to a corresponding cell, that is, a cell providing at least one of the MIB and the SIB1 received, is possible through at least one value of the MIB and the SIB 1 received, and if determining that it is possible, indicates to perform the random access procedure (e.g., the random access procedure of FIG. 4 or FIG. 7).

The methods according to the embodiments described in the claims or the specification of the present invention may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present invention.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining some or all of those recording media. A plurality of memories may be included.

Also, the program may be stored in an attachable storage device accessible via a communication network such as Internet, Intranet, LAN, wide LAN (WLAN), or storage area network (SAN), or a communication network by combining these networks. Such a storage device may access a device which executes an embodiment of the present invention through an external port. In addition, a separate storage device on the communication network may access the device which executes an embodiment of the present invention.

In the specific embodiments of the present invention, the elements included in the invention are expressed in a singular or plural form. However, the singular or plural expression is appropriately selected according to a proposed situation for the convenience of explanation, the present invention is not limited to a single element or a plurality of elements, the elements expressed in the plural form may be configured as a single element, and the elements expressed in the singular form may be configured as a plurality of elements.

Meanwhile, while the specific embodiment has been described in the explanations of the present invention, it will be noted that various changes may be made therein without departing from the scope of the present invention. Thus, the scope of the present invention is not limited and defined by the described embodiment and is defined not only the scope of the claims as below but also their equivalents.

The invention claimed is:

1. A method performed by a first user equipment (UE) in a wireless communication system, the method comprising:
 receiving, from a base station, information indicating whether a cell is barred for a UE with a reduced capability or not;
 in case that the information indicates that the cell is not barred for the UE with the reduced capability, identifying that the cell is not barred; and
 performing a random access procedure with the base station using first configuration information on an initial uplink (UL) bandwidth part (BWP) for the UE with the reduced capability and second configuration information on an initial downlink (DL) BWP for the UE with the reduced capability,
 wherein the first configuration information and the second configuration information are included in a system information block 1 (SIB1) received from the base station.

2. The method of claim 1, further comprising:
 receiving, from the base station, a system information block comprising information indicating whether the UE with the reduced capability is allowed to access a frequency for inter-frequency cell reselection.

3. The method of claim 1, further comprising:
 in case that the information indicates the cell is barred for the UE with the reduced capability, performing a cell re-selection to another cell on a same frequency as the barred cell.

4. The method of claim 1, wherein the SIB1 further includes first information on an initial UL BWP for a general UE and second information on an initial DL BWP for the general UE.

5. The method of claim 1, wherein the performing of the random access procedure further comprises:
 transmitting, to the base station, a message 3 for the random access procedure, and wherein the message 3 comprises a logical channel identifier for the UE with the reduced capability.

6. The method of claim 1, wherein the identifying that the cell is not barred comprises:
 in case that the information indicates the cell is not barred for the UE with the reduced capability and the first UE supports an UL channel bandwidth which is wider than or equal to a bandwidth of the initial UL BWP for the UE with the reduced capability, identifying the cell is not barred.

7. A first user equipment (UE) in a wireless communication system, the first UE comprising:
a transceiver; and
a controller coupled with the transceiver and configured to:
receive, from a base station, information indicating whether a cell is barred for a UE with a reduced capability or not,
in case that the information indicates that the cell is not barred for the UE with the reduced capability, identify that the cell is not barred, and
perform a random access procedure with the base station using first configuration information on an initial uplink (UL) bandwidth part (BWP) for the UE with the reduced capability and second configuration information on an initial downlink (DL) BWP for the UE with the reduced capability,
wherein the first configuration information and the second configuration information are included in a system information block 1 (SIB1) received from the base station.

8. The first UE of claim 7, wherein the controller is further configured to:
receive, from the base station, a system information block comprising information indicating whether the UE with the reduced capability is allowed to access a frequency different from a frequency for inter-frequency cell reselection.

9. The first UE of claim 7,
wherein a random access preamble for the random access procedure is transmitted to the base station on the initial UL BWP for the UE with the reduced capability, and
wherein a random access response for the random access procedure is received from the base station on the initial DL BWP for the UE with the reduced capability.

10. The first UE of claim 7, wherein the controller is further configured to:
in case that the information indicates the cell is barred for the UE with the reduced capability, perform a cell re-selection to another cell on a same frequency as the barred cell.

11. The first UE of claim 7, wherein the SIB1 further includes first information on an initial UL BWP for a general UE, and second information on an initial DL BWP for the general UE.

12. The first UE of claim 7, wherein a message 3 for the random access procedure is transmitted to the base station, and wherein the message 3 comprises a logical channel identifier for the UE with the reduced capability.

13. The first UE of claim 7, wherein the controller is configured to:
receive, from the base station, a message enquiring a capability of the first UE, and transmit, to the base station, a response message comprising information indicating whether the first UE supports the reduced capability as a response to the message.

14. The first UE of claim 7, wherein, in case that the information indicates the cell is not barred for the UE with the reduced capability and the first UE supports an UL channel bandwidth which is wider than or equal to a bandwidth of the initial UL BWP for the UE with the reduced capability, the cell is identified as not barred.

15. A base station in a wireless communication system, the base station comprising:
a transceiver; and
a controller coupled with the transceiver and configured to:
transmit information indicating that a cell associated with the base station is not barred for a user equipment (UE) with a reduced capability, and
perform a random access procedure with a first UE, using first configuration information on an initial uplink (UL) bandwidth part (BWP) for the UE with the reduced capability and second configuration information on an initial downlink (DL) BWP for the UE with the reduced capability,
wherein the first configuration information and the second configuration information are included comprised in a system information block 1 (SIB1) transmitted to the first UE.

16. The base station of claim 15, wherein a random access preamble for the random access procedure is received from the first UE on the initial UL BWP for the UE with the reduced capability, and
wherein a random access response for the random access procedure is transmitted to the first UE on the initial DL BWP for the UE with the reduced capability.

17. The base station of claim 15, wherein the controller is further configured to:
transmit, to the first UE, a system information block comprising information indicating whether the UE with the reduced capability is allowed to access a frequency for inter- frequency cell reselection.

18. The base station of claim 15, wherein the controller is further configured to:
transmit, to the first UE, a message enquiring a capability of the first UE, and
receive, from the first UE, a response message comprising information indicating whether the first UE supports the reduced capability, as a response to the message.

19. The base station of claim 15, wherein a message 3 for the random access procedure is received from the first UE, and wherein the message 3 comprises a logical channel identifier for the UE with the reduced capability.

20. The base station of claim 15, wherein the SIB1 further includes first information on an initial UL BWP for a general UE and second information on an initial DL BWP for the general UE.

* * * * *